(12) United States Patent
Kikuchi

(10) Patent No.: US 8,443,282 B2
(45) Date of Patent: May 14, 2013

(54) INFORMATION PROCESSING APPARATUS, INFORMATION PROCESSING METHOD, AND INFORMATION PROCESSING PROGRAM FOR GENERATING AN ADAPTIVE LAYOUT TEMPLATE WHICH MAY HAVE A TRANSPOSITION LINK

(75) Inventor: Koji Kikuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1182 days.

(21) Appl. No.: 12/015,304

(22) Filed: Jan. 16, 2008

(65) Prior Publication Data

US 2008/0189603 A1 Aug. 7, 2008

(30) Foreign Application Priority Data

Jan. 16, 2007 (JP) ................................. 2007-007340

(51) Int. Cl.
 *G06N 3/00* (2006.01)
(52) U.S. Cl.
 USPC .......................................................... 715/243
(58) Field of Classification Search ................... 715/201, 715/202, 204, 205, 243, 246, 247, 253, 203, 715/234, 235, 238, 251, 273
 See application file for complete search history.

(56) References Cited

U.S. PATENT DOCUMENTS

| | | | | |
|---|---|---|---|---|
| 5,249,137 A | * | 9/1993 | Wilson et al. ...................... | 703/2 |
| 5,845,303 A | * | 12/1998 | Templeman ................... | 715/255 |
| 5,873,106 A | * | 2/1999 | Joseph ........................... | 715/203 |
| 5,895,476 A | * | 4/1999 | Orr et al. ........................ | 715/202 |
| 5,956,737 A | * | 9/1999 | King et al. ..................... | 715/202 |
| 6,253,220 B1 | * | 6/2001 | Le Beux et al. ............... | 715/209 |
| 6,720,965 B1 | * | 4/2004 | Hirosawa et al. ............. | 345/423 |
| 7,401,289 B2 | * | 7/2008 | Lachhwani et al. .......... | 715/243 |
| 7,412,647 B2 | * | 8/2008 | Sellers et al. ................. | 715/253 |
| 7,468,805 B2 | * | 12/2008 | Lo et al. ....................... | 358/1.18 |
| 7,555,710 B2 | * | 6/2009 | Kobashi et al. ............... | 715/243 |
| 7,707,495 B2 | * | 4/2010 | Hosotsubo .................... | 715/243 |
| 7,712,026 B2 | * | 5/2010 | Kobashi et al. ............... | 715/243 |
| 7,747,947 B2 | * | 6/2010 | Balinsky ........................ | 715/243 |
| 7,805,672 B2 | * | 9/2010 | Kobashi ........................ | 715/252 |
| 2003/0014442 A1 | * | 1/2003 | Shiigi et al. .................... | 707/513 |
| 2004/0163047 A1 | * | 8/2004 | Nagahara et al. ............. | 715/517 |
| 2004/0177316 A1 | * | 9/2004 | Layzell et al. ................ | 715/500 |
| 2004/0187079 A1 | * | 9/2004 | Yamada et al. ............... | 715/517 |
| 2004/0225961 A1 | * | 11/2004 | Ohashi et al. ................. | 715/517 |

(Continued)

FOREIGN PATENT DOCUMENTS

| | | |
|---|---|---|
| JP | 7-129658 A | 5/1995 |
| JP | 2004-165909 A | 6/2004 |
| JP | 2006-048533 A | 2/2006 |
| JP | 2006-140591 A | 6/2006 |

*Primary Examiner* — Kyle Stork
(74) *Attorney, Agent, or Firm* — Canon USA, Inc., IP Division

(57) ABSTRACT

An information processing apparatus for generating a template in which is arranged a plurality of areas where content data can be inserted, includes a setting unit configured to associate the areas with one another, a determination unit configured to determine based on the content data whether the areas are to be arranged in a vertical direction or in a horizontal direction as an arrangement direction, a layout unit configured to arrange the areas in the arrangement direction determined by the determination unit, an input unit configured to input the content data into the areas arranged by the layout unit, and an output unit configured to output the areas where the content data is inserted by the input unit.

18 Claims, 21 Drawing Sheets

U.S. PATENT DOCUMENTS

| | | | |
|---|---|---|---|
| 2004/0255245 A1* | 12/2004 | Yamada et al. | 715/517 |
| 2005/0094205 A1* | 5/2005 | Lo et al. | 358/1.18 |
| 2005/0172221 A1* | 8/2005 | Kobashi et al. | 715/513 |
| 2005/0172226 A1* | 8/2005 | Kobashi et al. | 715/518 |
| 2005/0179947 A1* | 8/2005 | Kobashi et al. | 358/1.18 |
| 2005/0183010 A1* | 8/2005 | Iwasaki | 715/517 |
| 2005/0237587 A1* | 10/2005 | Nakamura | 358/527 |
| 2006/0026504 A1* | 2/2006 | Balinsky | 715/513 |
| 2006/0031762 A1 | 2/2006 | Takashima | |
| 2006/0107205 A1* | 5/2006 | Makela | 715/520 |
| 2006/0150088 A1* | 7/2006 | Kraft et al. | 715/517 |
| 2006/0213386 A1* | 9/2006 | Funakura | 101/463.1 |
| 2006/0259860 A1* | 11/2006 | Kobashi | 715/521 |
| 2008/0120535 A1* | 5/2008 | Lynton | 715/243 |
| 2008/0240680 A1* | 10/2008 | Yamada | 386/95 |

\* cited by examiner

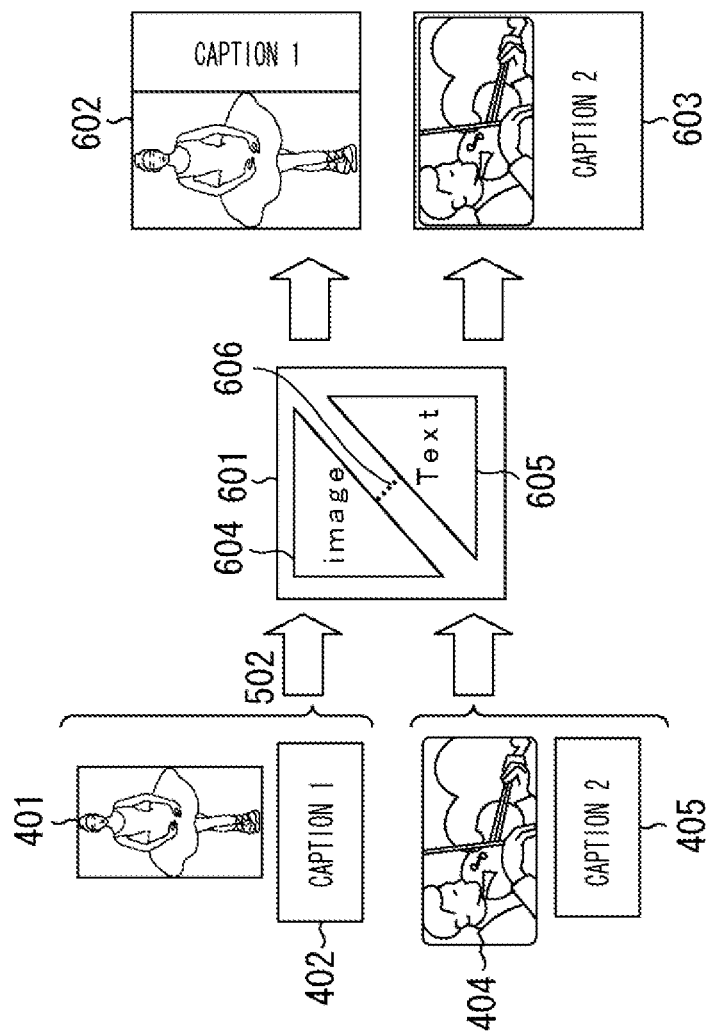

INFORMATION PROCESSING APPARATUS, INFORMATION PROCESSING METHOD, AND INFORMATION PROCESSING PROGRAM FOR GENERATING AN ADAPTIVE LAYOUT TEMPLATE WHICH MAY HAVE A TRANSPOSITION LINK

BACKGROUND OF THE INVENTION

1. Field of the Invention

The present invention relates to an information processing apparatus and an information processing method, and more particularly to those suitable for optimal layout of different amount of contents on a client-by-client basis.

2. Description of the Related Art

One-to-One marketing is a kind of database marketing in which personal attribute information relating to a client such as age, sex, hobby, preference, and buying history is managed by a database. Further, the information is analyzed to recognize the client needs and to provide accurate suggestions suitable to the client. A typical example of One-to-One marketing is variable print.

Along with recent developments in desktop publishing (DTP) technique and widespread use of digital printers, a variable print system for customizing documents on a client basis and outputting the customized documents has been developed. Under such circumstances, there is an increasing demand to optimize layout of different amounts of contents on a client basis.

The variable print system is realized by designing layout of containers on a document template and associating a database with the layout. However, a text container size and an image container size are fixed. Thus, in the case of inserting data from the database into a container, if a data amount exceeds a container size, there arises a problem of overlapping of the text and clipping of the image. Further, a smaller data amount compared with the container size leads to a problem of forming an unnecessary space on the image.

To solve the above problems, an automatic layout system has been proposed. The automatic layout system can set a text container size and an image container size as variables. In the automatic layout system, a container size is changed according to an amount of data to be inserted.

Further, in handling text data, when text data that cannot be fit into a container of fixed size is inserted into that container, a font size of the text data is reduced to display all the text data in the container.

However, if a size of a container is enlarged, the container can overlap with another container on the same document. Further, in the case of adjusting a font size, when a large amount of text data is inserted, the font size is reduced to be too small to recognize.

Another example of the automatic layout technique, which has been developed to overcome these problems, is discussed in a "layout design apparatus" of Japanese Patent Application Laid-Open No. 7-129658. According to this technique, if a size of any container becomes larger, a size of an adjacent container is reduced.

Further, a template switching technique as discussed in Japanese Patent Application Laid-Open No. 2006-48533 prepares a plurality of templates in order to further extend possible representation of the automatic layout. Further, Japanese Patent Application Laid-Open No. 2006-48533 describes a method of selecting a target template from a plurality of templates in accordance with conditions of data to be input, and inserting the data into the selected template.

However, the above described conventional technique discussed in Japanese Patent Application Laid-Open No. 2006-48533 requires preparing of a plurality of templates, and template generating processing is burdensome to a user.

For example, assuming that vertically long image data is input, a user needs to prepare a template for vertically long image data. Assuming that horizontally long data is input, the user needs to prepare a template for horizontally long data. In particular, the above conventional variable print fails to respond well to situations where there are many types of input data. For example, to prepare a plurality of types of templates corresponding to all the types of input data, which in some possible situations may range from several thousand to several hundreds of thousands of types, in advance would impose a huge burden on a user.

SUMMARY OF THE INVENTION

The present invention is directed to an apparatus and method of changing template layout in accordance with input data to reduce a load in generating a template when laying out data.

According to an aspect of the present invention, an information processing apparatus for generating a template in which is arranged a plurality of areas where content data is inserted includes a setting unit configured to associate the areas with one another, a determination unit configured to determine based on the content data whether the areas are to be arranged in a vertical direction or in a horizontal direction as an arrangement direction in the template, a layout unit configured to arrange the areas in the arrangement direction determined by the determination unit, an input unit configured to insert the content data into the areas, and an output unit configured to output the areas where the content data is inserted by the input unit.

BRIEF DESCRIPTION OF THE DRAWINGS

The accompanying drawings, which are incorporated in and constitute a part of the specification, illustrate exemplary embodiments, features, and aspects of the present invention and, together with the description, serve to explain the principles of the present invention.

FIG. 6 illustrates an example of an operation of the vertical/horizontal transposition link according to an exemplary embodiment of the present invention.

DETAILED DESCRIPTION OF THE EMBODIMENTS

Various exemplary embodiments, features, and aspects of the present invention are described in detail below with reference to the drawings.

First Exemplary Embodiment

Figure 1:
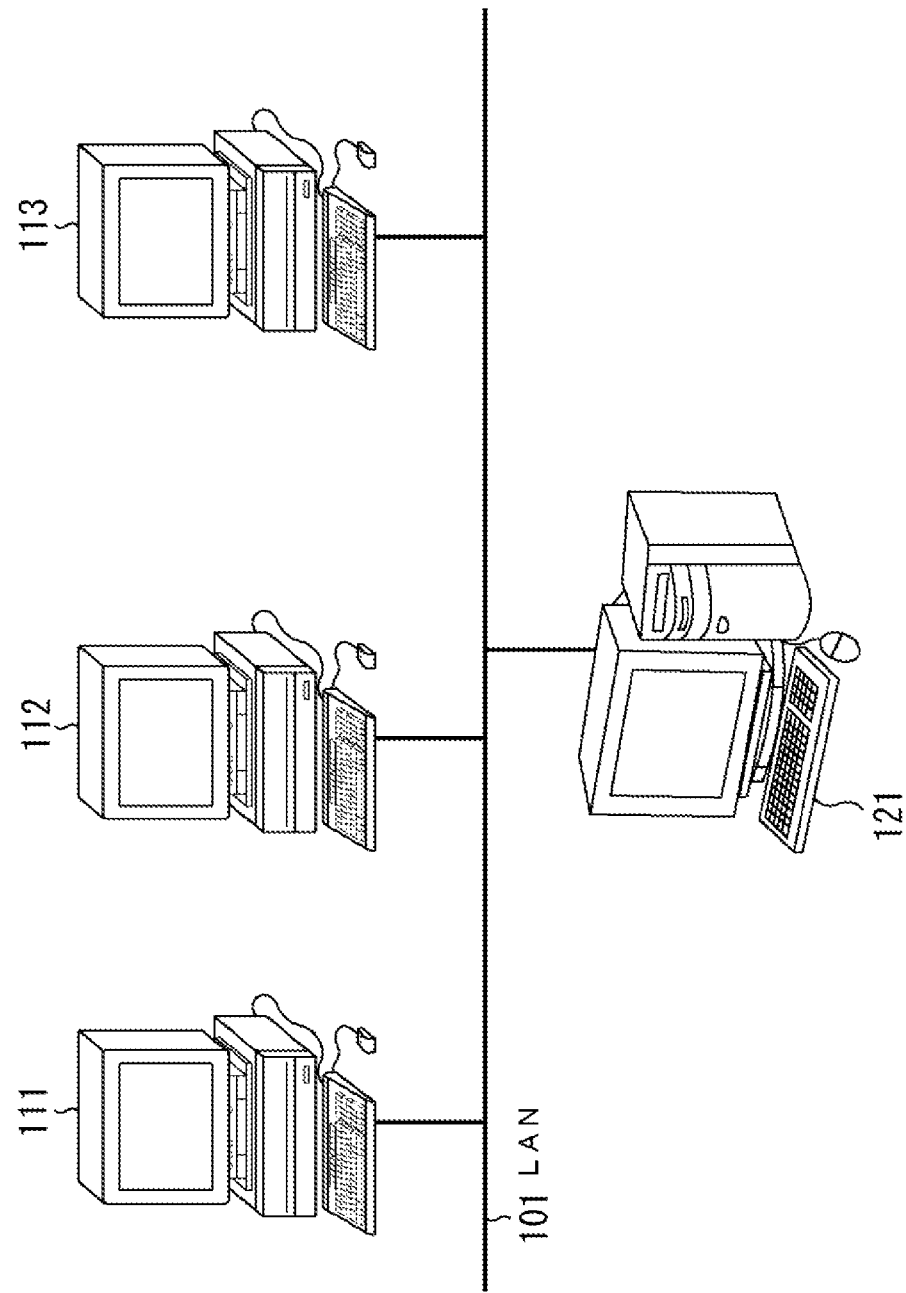
FIG. 1 is a block diagram of a network configuration example according to an exemplary embodiment of the present invention.

FIG. 1 is a block diagram of network configuration that enables a client having a document template generating/outputting function to perform an instruction/operation with respect to an automatic layout system server, to which an automatic layout system according to an exemplary embodiment of the present invention is applied.

In FIG. 1, the network configuration includes a local area network (LAN) 101. The LAN 101 is connected with a personal computer (hereinafter referred to as "PC").

The present exemplary embodiment describes an example in which a first client PC 111, a second client PC 112, and a third client PC 113 are connected. Further, the server PC 121 that includes the automatic layout system of the present exemplary embodiment is connected to the LAN 101.

The server PC 121 includes an automatic layout system server function. The server PC 121 receives an instruction from document template generating/outputting software of the client PCs 111, 112, and 113, and sends a processing result back to the client PCs that has issued the instruction. In this exemplary embodiment, a communication between a server and a client is not limited to any particular method.

Further, in the server PC 121, an instruction may be directly sent to a form management server of this exemplary embodiment.

As for an internal configuration of the first client PC 111, the second client PC 112, and the third client PC 113, any general PC connectable with the LAN 101 and capable of operating a document template form generating/outputting function is applicable and is not limited to any particular PC, and may moreover be practiced with other varieties of computer, including workstations and Macintosh computers, and may be practiced using conventional operating system support, such as Microsoft Windows XP, Microsoft Windows Vista, Mac OS, Unix, Linux, and the like. The description of such computers and operating systems are well known in the art and accordingly is omitted here.

Figure 2:
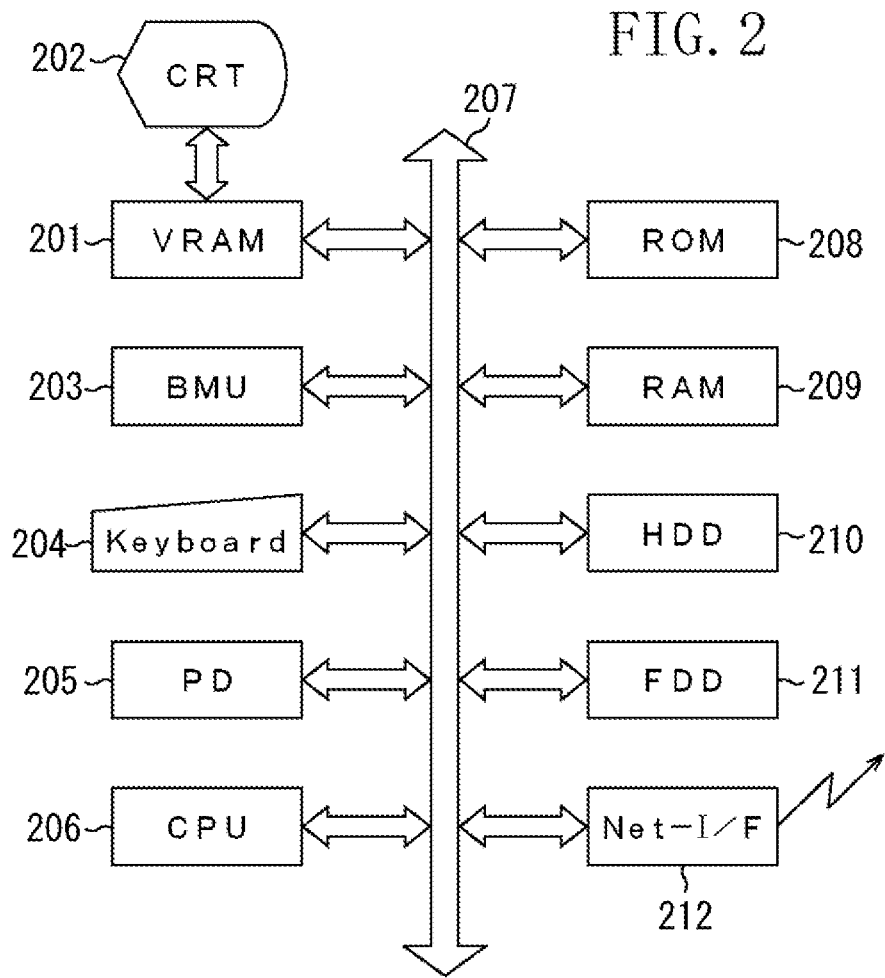
FIG. 2 is a block diagram of a server personal computer (PC) according to an exemplary embodiment of the present invention.

FIG. 2 will now be described. FIG. 2 is a block diagram of schematic configuration of a computer system that realizes the server PC 121 and each of the client PCs 111, 112, and 113 of FIG. 1.

In FIG. 2, a video random access memory (VRAM) 201 rasterizes and stores text and image data displayed on a screen of a cathode ray tube (CRT) display device 202. A bit move unit (BMU) 203 controls data transfer between memories or between a memory and each device.

A keyboard 204 includes various keys for inputting data, and a pointing device (PD) 205 is used to point out an icon or the like on a screen. A central processing unit (CPU) 206 controls each unit of the information processing apparatus based on control programs stored in a read only memory (ROM) 208 (i.e., a program for implementing the present exemplary embodiment as described above as well as a program for implementing an exemplary embodiment as described below and an error handling program).

A RAM 209 is used as a work area when the CPU 206 performs each of the above-described programs and as a temporary save area at the time of handing an error. The configuration in FIG. 2 also includes a hard disk drive (HDD) 210 and a floppy disk drive (FDD) 211. Each disk is used to store the following application programs or data, database, and library.

A network interface (NET-I/F) 212 performs data control and diagnosis on a network in order to transfer data to the client PCs 111, 112, and 113 via a network. An input/output (I/O) bus 207 (i.e., an address bus, a data bus, and a control bus) connects the above units with one another.

In the above configuration, when the apparatus is powered on, the CPU 206 initializes the apparatus in accordance with a boot program stored in the ROM 208, loads an operating system (OS) from the HDD 210, and then executes various applications.

Incidentally, the apparatus of FIG. 2 according to the present exemplary embodiment can be a basic general-purpose information processing apparatus (e.g., personal computer) programmed in accordance with the present invention. Programs are stored on a hard disk or the like. However, programs may also be stored in a ROM. The present exemplary embodiment is not limited to using any particular storage medium.

Figure 11:
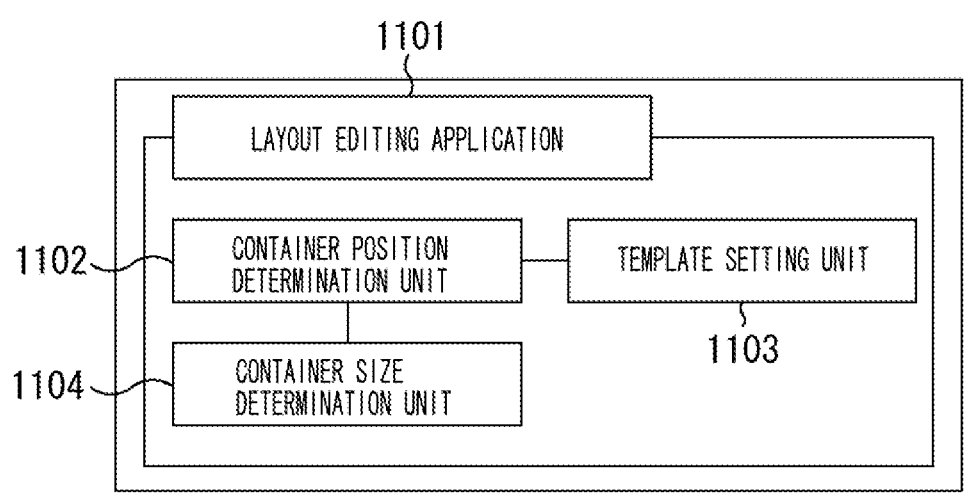
FIG. 11 illustrates an example of layout editing application according to an embodiment of the present invention.

FIG. 11 illustrates a layout editing application 1101 stored in the above client PCs 111, 112, and 113 (information processing apparatuses) and performs the following layout processing. The layout editing application 1101 is composed of a container position determination unit 1102, a container size determination unit 1104, and a template setting unit 1103.

The container position determination unit 1102 determines a position of each container set in a template according to a size of content data inserted into each container and settings of the template. The term container refers to an area into which content data is input. In the context of the present specification, the container is also referred to as an area, and a sub template is also referred to as an area.

The container size determination unit 1104 determines a size of each container set in a template in accordance with a size of content data inserted into each container and settings of the template. The container position determination unit 1102 determines in response to the content data whether to arrange the areas in a horizontal direction or a vertical direction as an arrangement direction. These determination units 1104 and 1102 may be composed of separate components or alternatively integrated as a single item. The template setting unit 1103 generates a template in response to a user's instruction. The layout editing application 1101 acts as a setting unit configured to associate areas with one another, a layout unit configured to arrange the areas in the arrangement direction determined by the determination unit, an input unit configured to insert the content data into the areas, and an output unit configured to output the areas where the content data is inserted by the input unit. The layout editing application 1101 also acts as comparison unit a comparison unit configured to compare an amount of change in size necessary to arrange content data horizontally as opposed to vertically.

Figure 15:
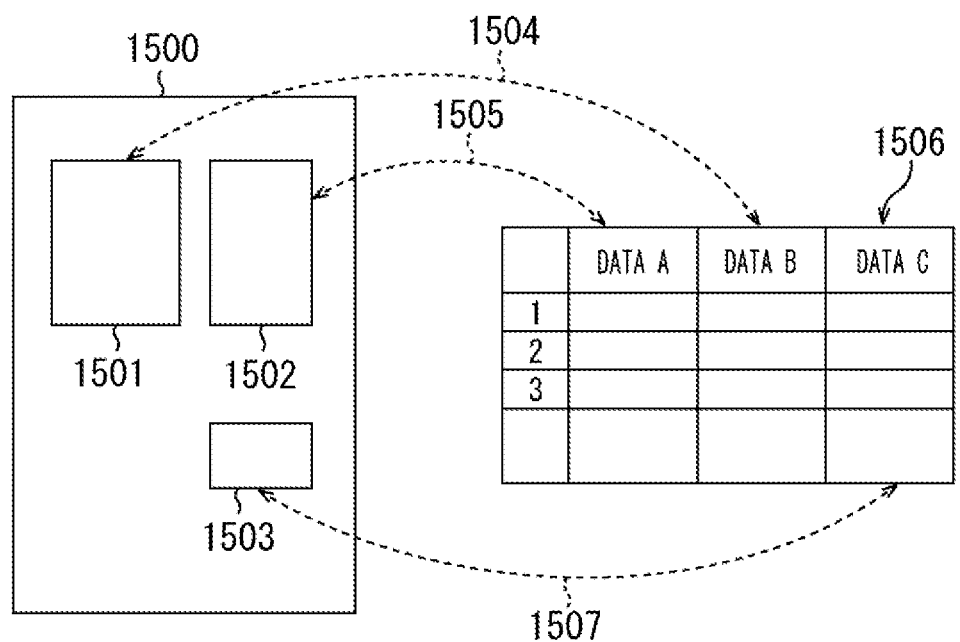
FIG. 15 illustrates an example of a relationship between a template and a database according to an exemplary embodiment of the present invention.

Referring next to FIG. 15, an overview of variable print according to the present exemplary embodiment is described below. FIG. 15 schematically illustrates the variable print of the present exemplary embodiment. In response to an operation instruction from a user, the layout editing application 1101 arranges a plurality of containers 1501, 1502, and 1503 on a page, sets restricting conditions of a position or a size of each container, and generates a document template 1500.

Further, the layout editing application 1101 associates the document template 1500 with a database 1506 and further associates each container 1501, 1502, and 1503 with a respective data field (DATA B, DATA A, and DATA C) in the database 1506 (as indicated by arrows 1504, 1505, and 1507 respectively). Information about an association between each container and each data field in the database 1506 is described in the document template 1500, and the document template 1500 is stored in the HDD 210.

The database 1506 is a file that describes item data on a record-by-record basis, which is stored in, for example, the HDD 210. In response to a user's instruction, the layout editing application 1101 inserts data, associated based on association information, into the containers 1501, 1502, and of the document template 1500 on a record-by-record basis.

For example, the application inserts data fields DATA B, DATA A, DATA C of a data record 1 into the containers 1501, 1502, 1503 respectively. Then, the layout editing application 1101 adjusts a size and an arrangement of each container (layout adjustment) in accordance with inserted data.

If an instruction is issued to display data in a preview mode, the layout editing application 1101 generates a layout-adjusted document image and outputs the image on a screen of the CRT 202 to display the image in a preview mode. If an instruction is issued to print data, the application converts the generated document image into printing data with a printer driver and outputs the converted data to a printer. The application processes data records 1, 2, 3, . . . in ascending order to attain variable data print. Printed data can thereby be varied according to each record.

Figure 3:
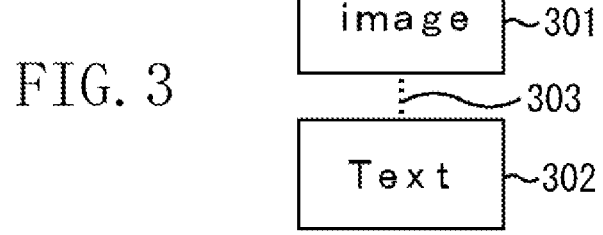
FIG. 3 illustrates an example of a general container/link.
Figure 4A:
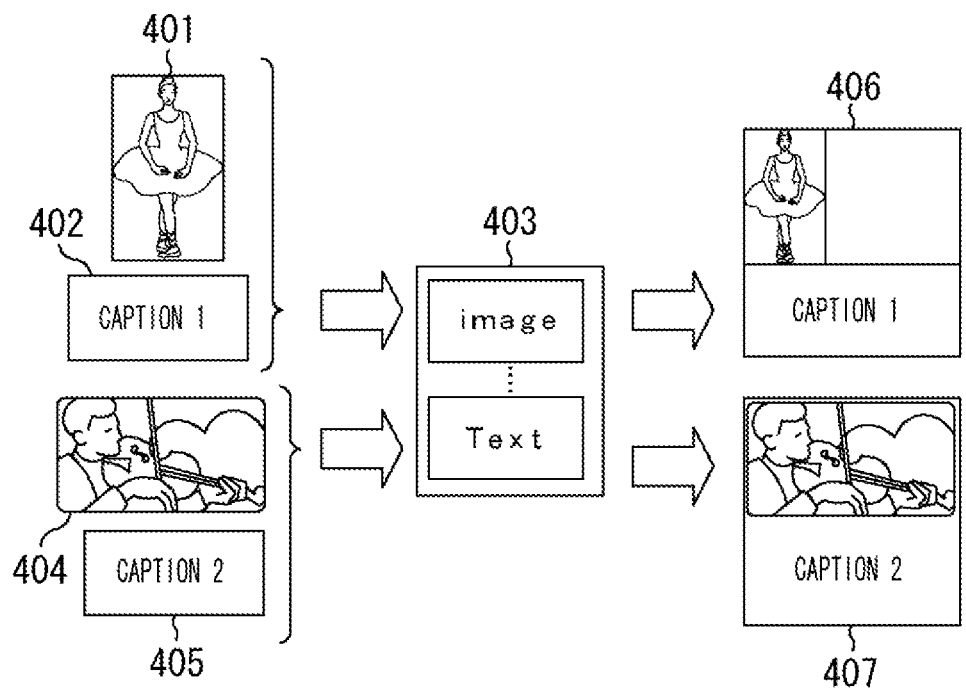
FIGS. 4A and 4B illustrate an example of an operation of the general container/link.
Figure 4B:
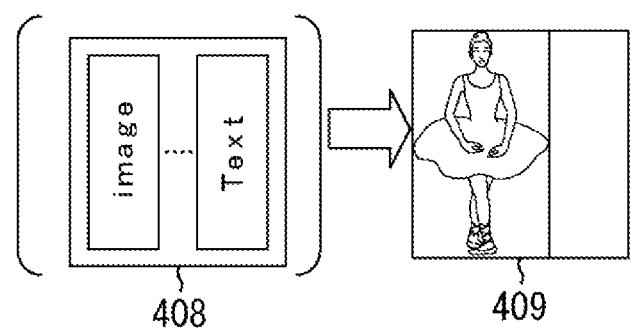

FIGS. 3, 4A, and 4B describe an example of a relationship between and operation of a container and a link.

In FIG. 3, image data (hereinafter alternatively referred to simply as "image") is inserted into a container 301, and text data (hereinafter alternatively referred to simply as "text") is inserted into a container 302. In this example, the container refers to an area into which data is inserted. Then, image data and text data to be inserted into these containers are referred to as content data. A link 303 arranges the containers 301 and 302 while mutually associating and linking these containers to each other. The link 303 is set to associate a plurality of containers with each other. The link 303 allows the containers 301 and 302 to form an insertion area in association with each other. The link 303 links the containers 301 and 302 in a vertical direction.

FIGS. 4A and 4B illustrate an example of layout obtained when content data is actually inserted into containers 301 and 302 linked with each other via the link 303 of FIG. 3.

FIG. 4A illustrates a vertically long image 401 and text data 402 that is indicated by "caption 1". FIG. 4A also illustrates a horizontally long image 404 and text data 405 that is indicated by "caption 2" similar to the text data 402. The container and the link of FIG. 3 are combined into one group in a template 403 of FIG. 4A.

Output data 406 is obtained by inserting the image 401 and the text 402 into the template 403. In this output data 406, the image 401 is inserted into the container 301 of FIG. 3 and thus is arranged on an upper half of the output data 406. The text 402 is inserted into the container 302 of FIG. 3 and thus is arranged on a lower half of the output data 406. Final adjustment of a container size by the link 303 is described below with reference to FIGS. 12 and 13.

Output data 407 is obtained by inserting the image 404 and the text 405 into the template 403. In this output data 407, the image 404 is inserted into the container 301 of FIG. 3 and thus is arranged on the upper half of the output data 407. The text 405 is inserted into the container 302 of FIG. 3 and thus is arranged on the lower half of the output data 407. In this way, an arrangement of the image and text data is determined.

When the two output data 406 and 407 are compared, the output data 407 includes a horizontally arranged image and horizontally arranged text, and thus efficiently utilizes the containers 301 and 302 arranged in the vertical direction by link 303 in the template 403. On the other hand, the output data 406 is obtained by inserting the vertically arranged image 404 into the container 301 of the template 403. The vertically long image data is reduced in size when inserted into the upper container 301 as can be seen from the output data 406.

The template 408 of FIG. 4B that includes a vertically long image container can generate well-balanced output data with little wasted space as illustrated in output data 409. If an appropriate template is selected for output data in this way, desired data can be output. However, if a user needs to prepare a plurality of templates corresponding to each pattern when it is uncertain which data is to be inserted as in a case of the variable print, such processing would impose a heavy burden on the user.

Figure 5A:
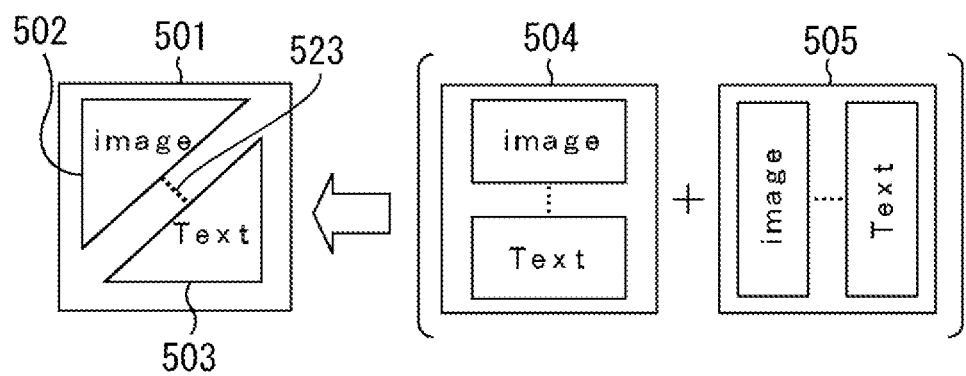
FIGS. 5A and 5B illustrate a vertical/horizontal transposition link and an example of a setting method thereof according to an exemplary embodiment of the present invention.
Figure 21:
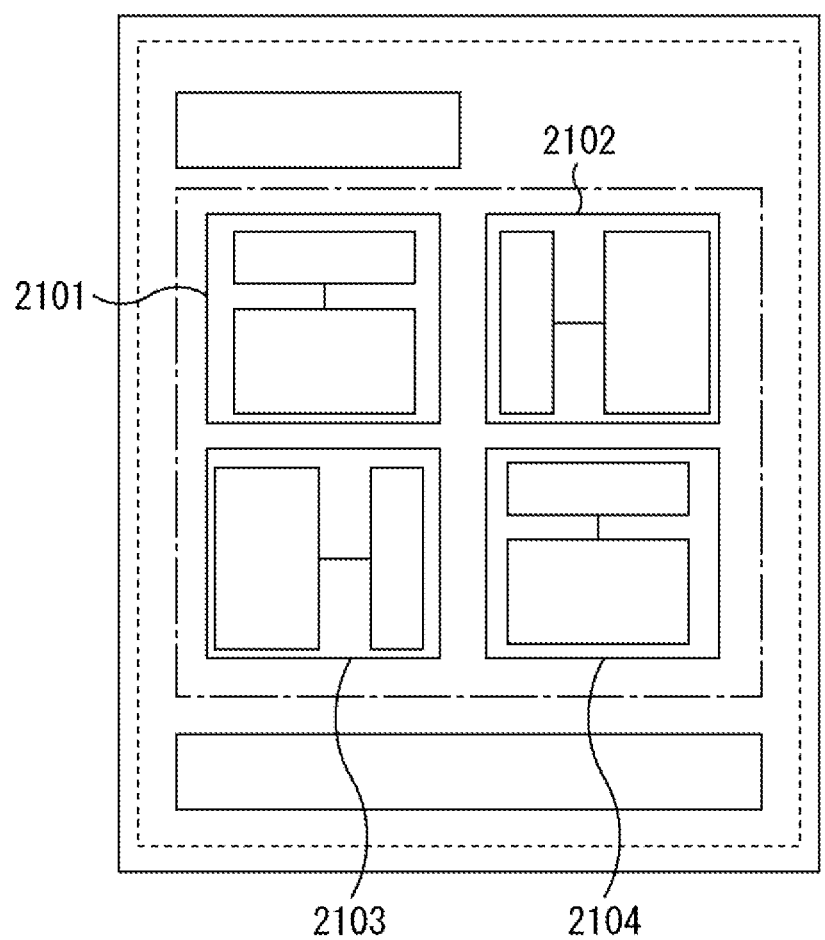
FIG. 21 illustrates an example of where a sub template having transposition attributes set therein is arranged in a flow area according to an exemplary embodiment of the present invention.
Figure 22:
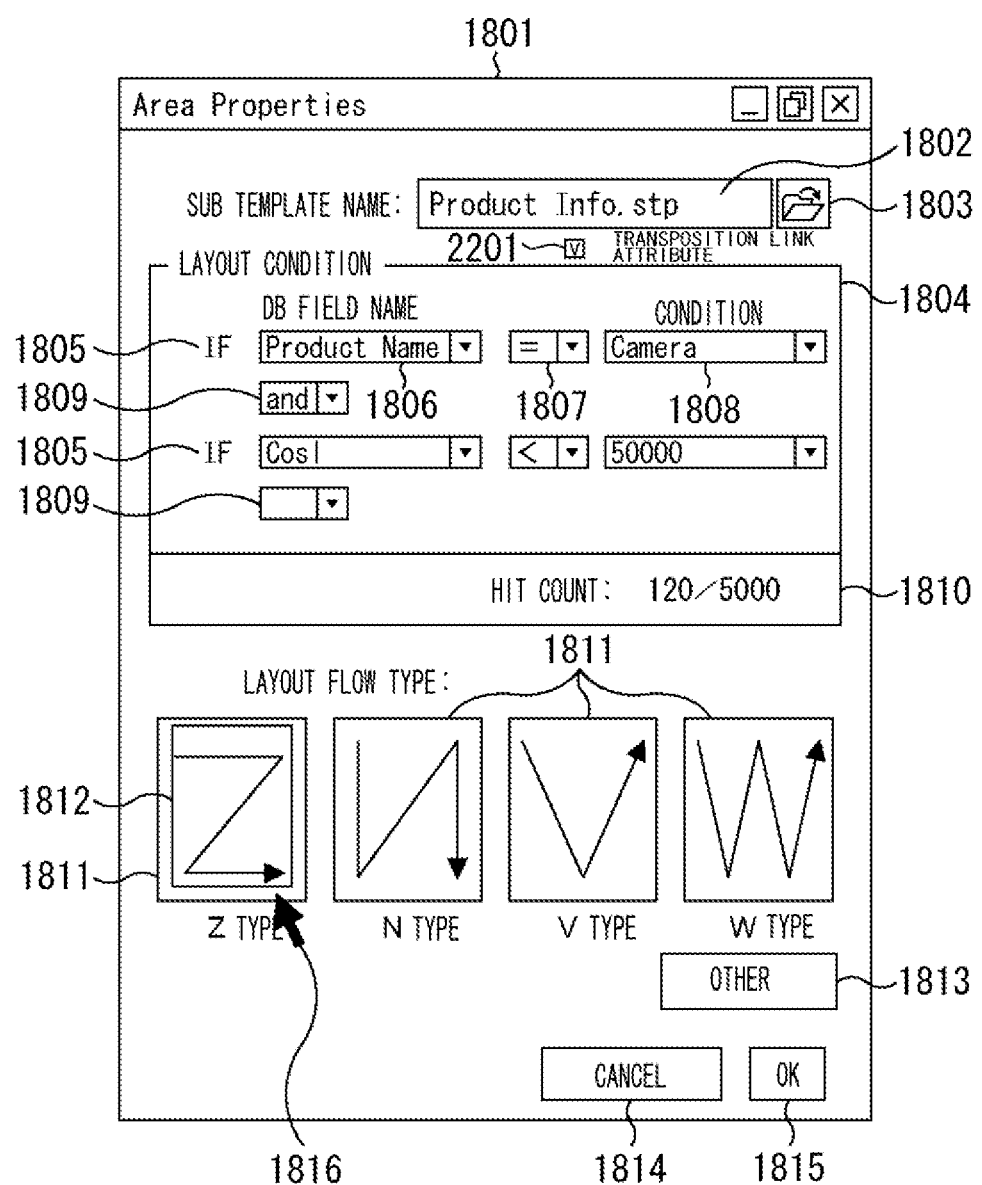
FIG. 22 illustrates an example of a setting screen for setting transposition attributes to a sub template according to an exemplary embodiment of the present invention.

FIG. 5A illustrates an example of a template where transposition attributes for changing an arrangement direction of a plurality of associated areas are set in accordance with content data inserted into the a plurality of areas. The transposition attributes can be set in a link or a sub template as described below. FIGS. 5A, 5B, 6, 7, 8, 9 and 10 illustrate an example where transposition attributes are set in a link. FIGS. 21 and 22 illustrate an example where transposition attributes are set in a sub template.

In FIG. 5A, a template 501 dynamically changes container layout, (including size and arrangement), in accordance with an orientation of an image in order to execute functionality of two distinct templates 504 and 505. The template 504 includes an image container on an upper half and a text container on a lower half and is linked in the vertical direction. The template 505 includes an image container on a left side and a text container on a right side linked in a horizontal direction.

If horizontally long image data is inserted into an image container 502, the image container 502 is arranged on the upper half as in the template 504. On the other hand, if vertically long image data is inserted into the image container 502, the image container 502 is arranged on the left side as in the template 505.

The template 501 includes the image container 502 and the text container 503. In practice, a vertical/horizontal transposition link 523 is set in the template 501. In the example of FIG. 5A, the image container 502 and the text container 503 are illustrated in a triangular form in order to show that the link 523 having transposition attributes (hereinafter referred to as "transposition link") is set.

Figure 5B:
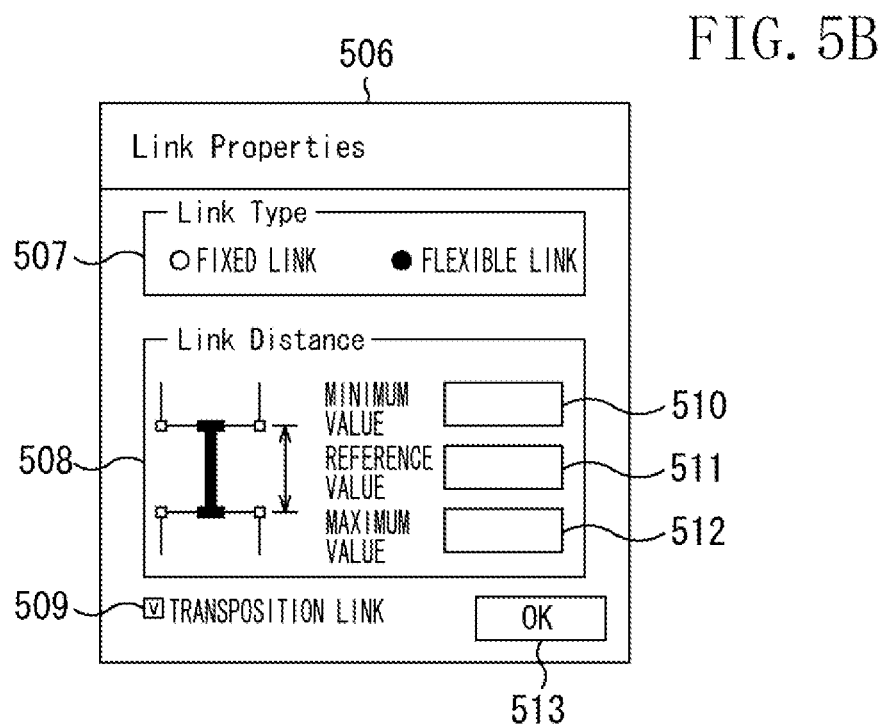

FIG. 5B illustrates an example of a link setting method. In response to a user's instruction to set a link, the application displays a link setting screen 506 including a link type setting area 507 and a link distance setting area 508. A fixed link in "Link Type" is a link having a fixed size, and a flexible link is a link having a size varying depending on content data input into each container. Further, a maximum value 510 and a minimum value 512 are set if a flexible link is selected, to define a flexible range of the link. Further, a reference value 511 is a size preset at the time of setting a link (or a size of the fixed link). A user checks the "transposition link" check box 509 through the link setting screen 506 to set the transposition link 523 and rotate a template in accordance with the content data inserted into the container. A value set on the link setting screen 506 is confirmed by clicking an OK button 513.

Referring next to FIG. 6, an example of an operation of the template 501 of FIG. 5A is described. In a template 601, a transposition link 606 as described above is set. Output data 602 and 603 are obtained by inserting the data 401 and 402 of FIG. 4A into the template 601 which has the structure and operates in the manner of the template 501 described above. When the image data 401 and the text data 402 are inserted into the template 601 as content data, the image data 401 is a vertically long image.

The layout editing application 1101 arranges an image container 604 and a text container 605 of the template 601 in a horizontal direction and then inserts content data into the containers 604 and 605 to execute layout processing. More particularly, output data 602 is obtained by inserting the image data 401 into the container 604, inserting the text data 402 into the container 605, and setting the transposition link 606. The output data 602 thereby obtained has the image data 401 illustrated on the left and the text data 402 on the right. As a result, unlike conventional techniques, the layout of the output data 602 is well-balanced with little wasted space according to the present embodiment.

Output data 603 is obtained by inserting data 404 and 405 of FIG. 4A into the template 601. More particularly, the image data 401 is inserted into container 604 and the text data 402 is inserted into container 605. Since the image data 404 is a horizontally long image, the image container 604 is arranged on the upper half in the output data 603, and the text container 605 is arranged on the lower half of the output data 603. Further detail regarding operation of embodiment is provided below.

As described above, even in the case of preparing only one template as performed in the conventional technique, the layout editing application 1101 determines whether to arrange containers in a horizontal direction (504) or a vertical direction (505) based on content data to be laid out. Therefore, well-balanced layout can be obtained without creating a burden for the user.

Figure 7:
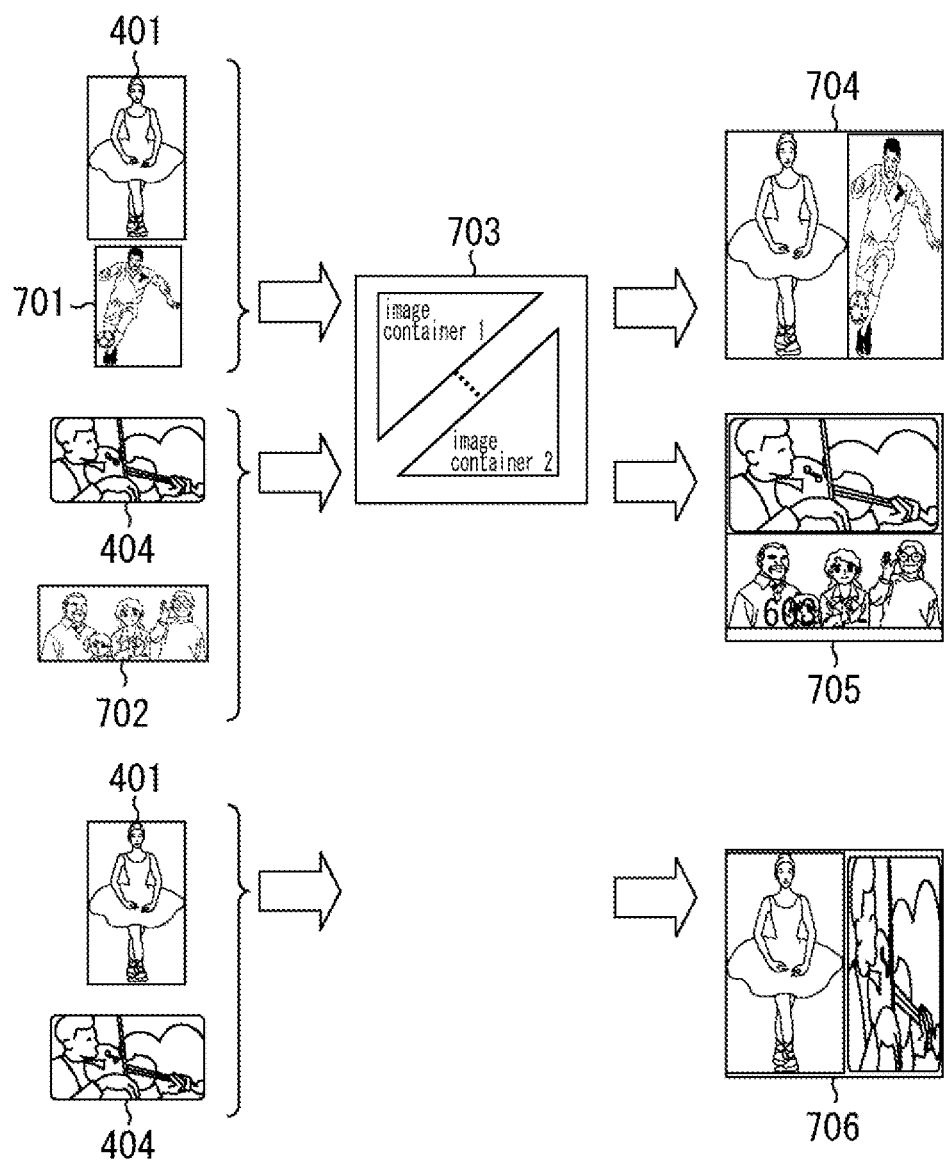
FIG. 7 illustrates another example of the operation of the vertical/horizontal transposition link according to an exemplary embodiment of the present invention.

Referring next to FIG. 7, an example is described in which image containers are linked via the vertical/horizontal transposition link.

In FIG. 7, two image containers are associated with each other via a transposition link in a template 703. Since the image data 401 and 701 are vertically long data, the image containers are arranged on the right and left sides as in output data 704. On the other hand, since the image data 404 and 702 are horizontally long data, the image containers are arranged on the upper half and the lower half as in output data 705.

If one container of the template 703 includes vertically long image data and the other container includes horizontally long image data, processing is executed as described below. In this case, the layout editing application 1101 analyzes priorities assigned to containers to determine whether to arrange containers in a horizontal direction or a vertical direction in accordance with data that is to be inserted into a higher-priority container.

As a method of analyzing priorities, for example, container attributes can be "prioritized". If the same priority is assigned to containers, a container defined first is preferentially processed. Since there are other methods of analyzing priorities, the present exemplary embodiment is not limited to any particular method.

For example, when the image container 1 is given higher priority than the image container 2 in the template 703, if the image data 401 is arranged in the image container 1 and the image data 404 is arranged in the image container 2, the image container 1 is given higher priority. Accordingly, the containers are arranged in a horizontal direction. As a result, a layout as shown in output data 706 is obtained.

Figure 8:
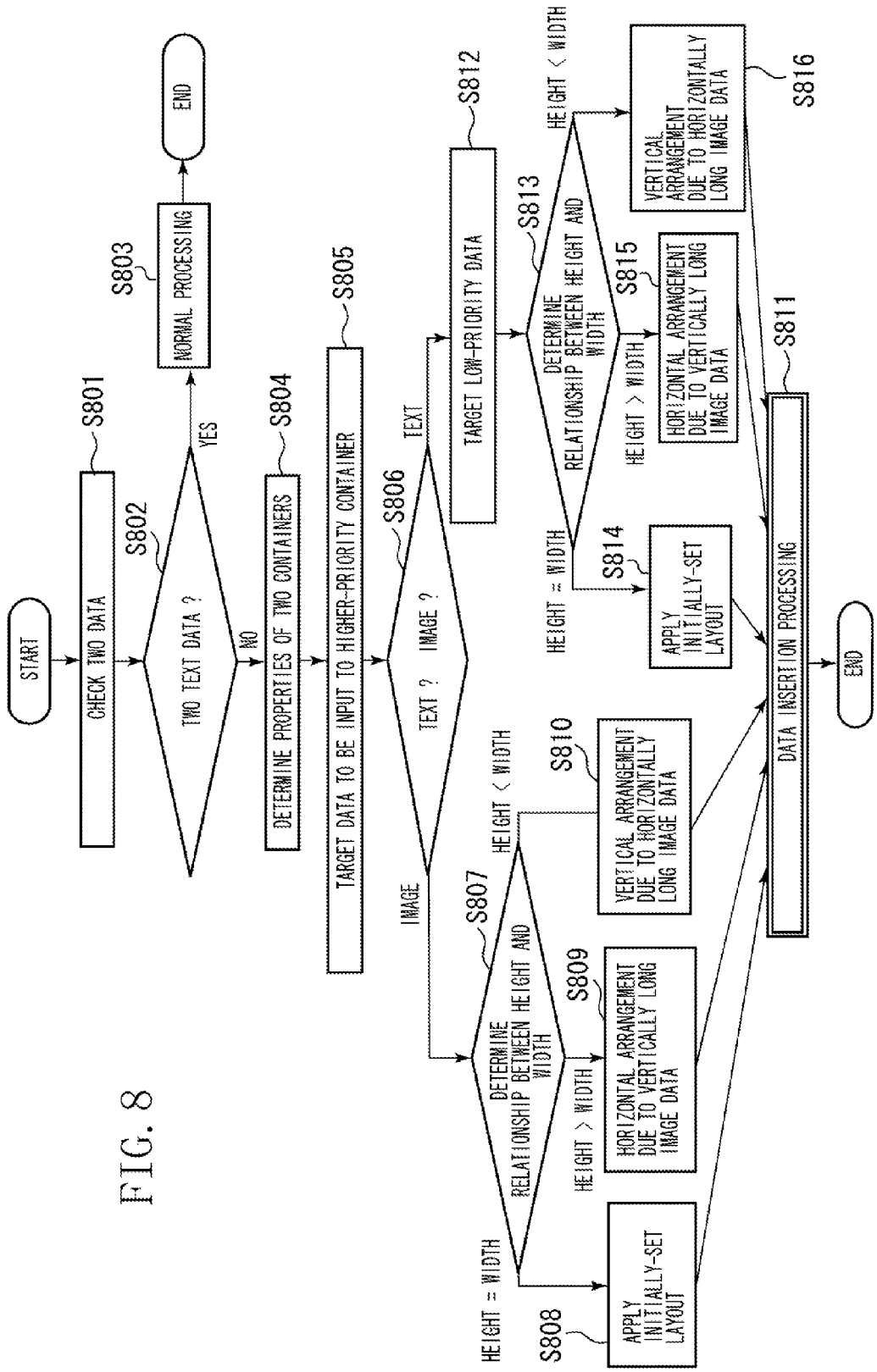
FIG. 8 is a flowchart of an example of a determination procedure according to an exemplary embodiment of the present invention.
Figure 14:
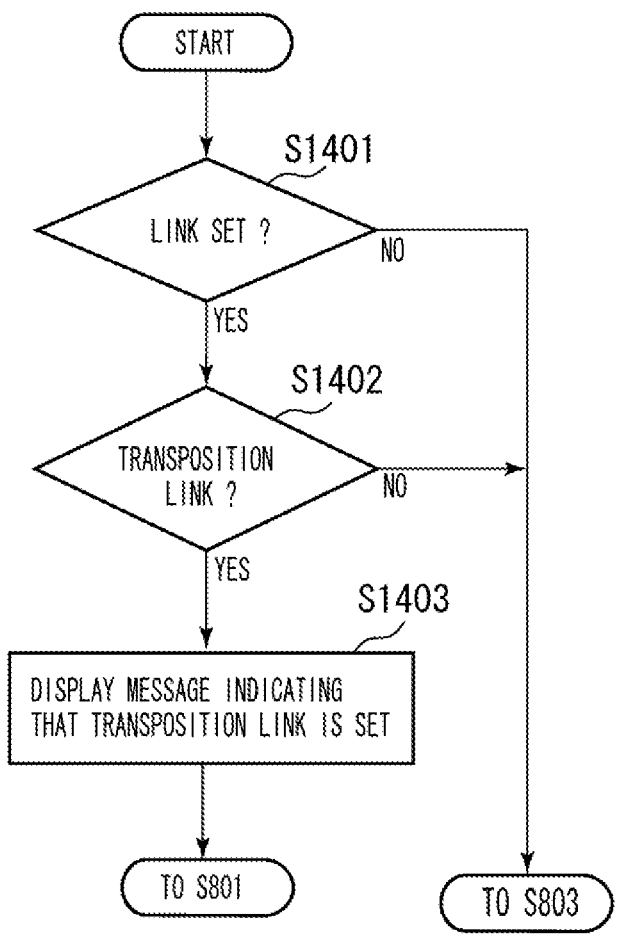
FIG. 14 is a flowchart of processing according to the first exemplary embodiment of the present invention.

Referring to flowcharts of FIGS. 8 and 14, a procedure of processing a template is described to which the vertical/horizontal transposition link of the first exemplary embodiment is set as described above with respect to FIGS. 5A, 5B, 6, and 7. The CPU 206 executes each step in the flowcharts of the present specification.

Referring to FIG. 14, overall processing is described, and referring to FIG. 8, processing performed when the transposition link is set is described in detail.

In step S1401, the layout editing application 1101 determines whether a link for associating a plurality of containers is set. If any link is set (YES in step S1401), in step S1402, the layout editing application 1101 determines whether transposition attributes are set in the link through the operational screen of FIG. 5B. Responsive to the operational screen of FIG. 5B, layout editing application 1101 associates a plurality of containers in accordance with a user's instruction.

If any transposition link is set (YES in step S1402), in step S1403, the layout editing application 1101 displays data that informs a user that the transposition link is set. The check box 509 in FIG. 5B is a specific example of such displayed data. Further, if the transposition link is set, containers associated via the transposition link are prioritized.

After informing that the transposition link is set in step S1403, the layout editing application 1101 advances to processing of step S801 of FIG. 8.

On the other hand, if either no link is set (NO in step S1401) or no transposition link is set (NO in step S1402), the processing advances to step S803 of FIG. 8 and the layout editing application 1101 executes general processing of step S803, and the process ends. As illustrated in FIG. 8, in step S801, the layout editing application 1101 first determines types of content data inserted into a template. As for the data type, the application can determine whether the content data is image data or text data by analyzing the content data.

Figure 12:
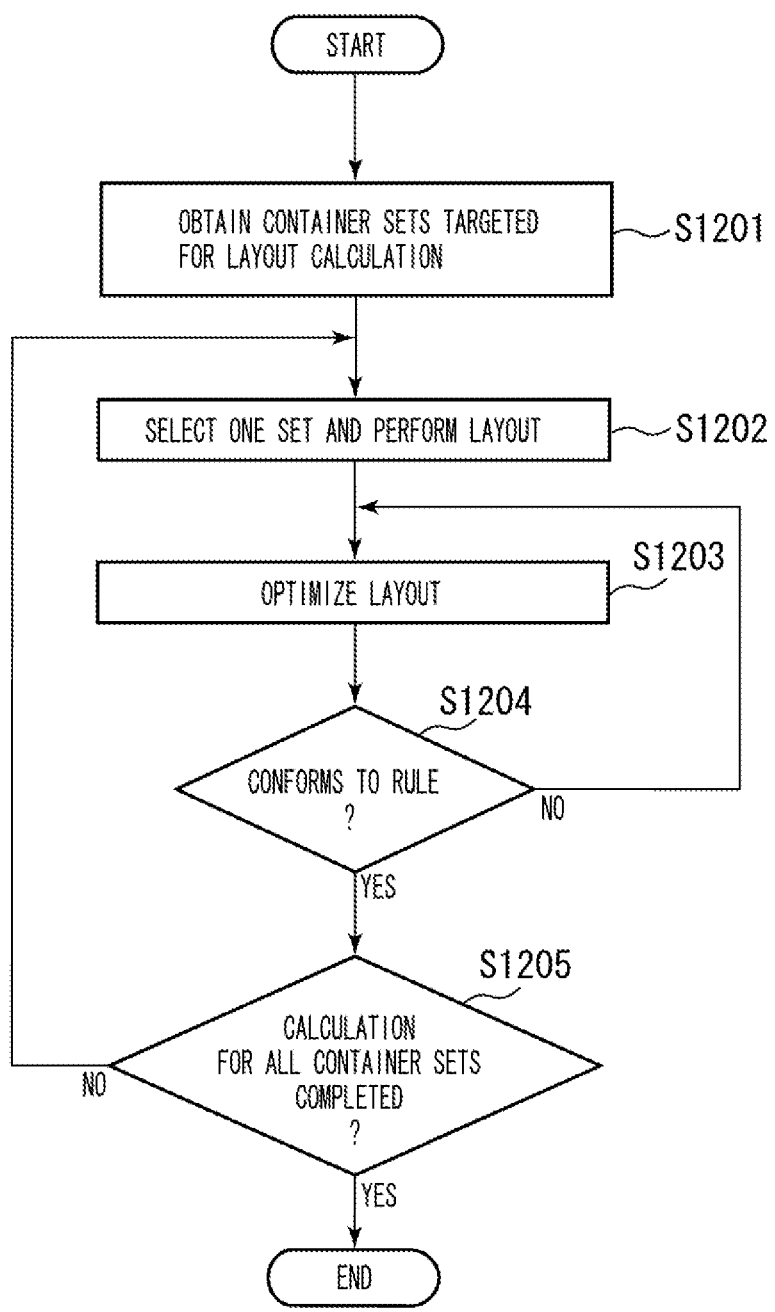
FIG. 12 is a flowchart of layout editing processing according to an exemplary embodiment of the present invention.

Next, in step S802, the layout editing application 1101 determines whether two content data inserted into a template are both text data. If both of the data are text data (YES in step S802), the processing advances to step S803 and the layout editing application 1101 executes general layout processing and then terminates the processing. According to the general layout processing, content data is inserted into containers included in a preset template and the following layout processing of FIG. 12 is performed without changing an arrangement direction of the containers.

On the other hand, if at least one container includes image data (NO in step S802), the processing advances to step S804. In step S804, the layout editing application 1101 determines priorities assigned to two containers because at least one of the two containers includes image data. Since priorities are assigned to the containers, the layout editing application 1101 analyzes the priorities to execute the processing in step S804. Next, in step S805, the layout editing application 1101 determines a type of data to be inserted into a container considered to have higher priority in the step S804.

In step S806, the layout editing application 1101 determines whether the data type obtained in step S805 is image data or text data. If the data type is image data (IMAGE in step S806), the processing advances to step S807. On the other hand, if the data type is text data (TEXT in step S806), the processing advances to step S812.

In step S807, the layout editing application 1101 compares height and width of the image data received from step S806. As a result of the comparison, if the height and width of the image data are equal, the processing advances to step S808. On the other hand, if the height of the image data is larger than the width of the image data, the processing advances to step S809. Further, if the height of the image data is smaller than the width of the image data, the processing advances to step S810.

Since the height and the width are equal in step S808, a square image has been input. The layout editing application 1101 performs container layout processing and then resets a vertical/horizontal transposition link. Then, the processing advances to step S811. This vertical/horizontal transposition link also serves as a general link.

Since the height is larger than the width in the image data in step S809, the layout editing application 1101 determines that the image data is vertically long. Therefore, the layout editing application 1101 arranges two containers in a template side by side (in a horizontal direction). After that, the processing advances to step S811.

Since the height is smaller than the width in the image data in step S810, the layout editing application 1101 determines that the image data is horizontally long. Thus, the layout editing application 1101 arranges two containers in the template in a vertical direction. After that, the processing advances to step S811. In step S811, a result of automatic layout processing is output after the confirmation of the layout as described below in detail with reference to FIGS. 12 and 13.

According to the described process, the layout editing application 1101 determines an arrangement direction of a plurality of areas, and determines whether to arrange the areas in a vertical direction or a horizontal direction based on content data input into the mutually associated containers. The vertical direction is a direction determined based on the sheet orientation, and the horizontal direction is a direction also determined based on the sheet orientation.

On the other hand, if the higher-priority container is text in step S806 (TEXT in step S806), the layout editing application 1101 specifies image data inserted into a lower-priority container as an analysis target in step S812.

Next, in step S813, the layout editing application 1101 determines an aspect ratio of image data to be inserted into the lower-priority container. If it is determined that height=width in step S813, the processing advances to step S814. If it is determined that height>width in step S813, the processing advances to step S815. If it is determined that height<width in step S813, the processing advances to step S816. The processing in step S814 is performed in the same manner as (or alternatively a similar manner to) that in step S808, the processing in step S815 is performed in the same manner as (or alternatively a similar manner to) that in step S809, and the processing in step S816 is performed in the same manner as (or alternatively a similar manner to) that in step S810. Therefore, further detailed description thereof will not be repeated.

The processing advances to step S811 after any of steps S814, S815 and S816 has ended, and output processing is executed. Then, the flowchart of the processing of this exemplary embodiment is completed.

Since how to set the vertical/horizontal transposition link of FIG. 5A will be easily understood, a flowchart of a detailed processing procedure is omitted here.

Referring next to FIG. 12, data insertion processing performed in step S811 is described. In step S1201, the layout editing application 1101 identifies a set of containers as a layout calculation target. The layout calculation is performed in such a manner that containers associated via a link are grouped into one set. For example, if four containers A, B, C, and D are laid out on a page, and a link associates the containers A and B and another link associates the containers C and D, the containers A and B are defined as a set 1, and the containers C and D are defined as a set 2.

In step S1202, the layout editing application 1101 selects a container set as a layout calculation target from the container sets determined in step S1201. Then, the layout editing application 1101 performs layout calculation on the selected container set.

First, the layout editing application 1101 determines sizes of two containers contained as a variable element in the selected container in a case where each container is not subject to limitation. The determination is made by calculation on the basis of image size or text amount of data to be inserted. To be specific, the layout editing application 1101 determines whether the container A is an image data container or a text container. This determination can be made on the basis of attributes set to each container as described above. If the container A is determined to be an image data container as a result of reading the data that is to be inserted into the container A, the container has a size realized when a size (the number of pixels in width and height directions and resolution) of the image data is not subjected to limitation.

Further, if the container A is a text container, an amount of text data to be inserted into the container A can be calculated on the basis of the number of characters and character attributes such as a font type, a font size, a character pitch, and a line pitch, which are determined based on the attributes of the container A. In the case of a text container, an aspect ratio of the container A cannot be determined without considering a limitation. Accordingly, the limitation is applied to the text container.

The layout editing application 1101 determines whether characters corresponding to the calculated data amount (text amount) can be all inserted to a width (horizontal direction) set as a basic pattern of the container A. If the data can be all inserted, a size (width and height) of the container A, which is set as a basic pattern, is not changed. However, if the data cannot be all inserted, the container A is enlarged within a page area. In this case, the layout editing application 1101 determines to what extent the container A is enlarged to include all text data and determines a size of the container A.

In step S1203, the layout editing application 1101 optimizes layout so as to minimize a difference between a size of containers to be laid out and an actual content data size. The optimization is calculated such that differences between a layout size and a size of content data to be inserted in each of containers are identical as much as possible. The containers are associated with one another to dynamically change their size. A specific example of the processing in step S1203 is described with reference to FIG. 13.

In step S1204, the layout editing application 1101 determines whether the layout is optimized in compliance with a preset rule. If the layout is not in compliance with the rule (NO in step S1204), the processing returns to step S1203, and the layout editing application 1101 performs calculation according to the rule. The rule specified herein refers to limitations set by a user at the time of designing layout. The rule includes a limitation of a variable range of a container size and limitation of a container position. As for the flexible link, the rule refers to a limitation of change in length of the link.

If the layout calculation is performed in compliance with the rule (YES in step S1204), the layout of the container set is completed. Then, the layout editing application 1101 performs the processing in steps S1202 to S1204 on all container sets on the page, and calculates the layout position of the entire pages. If it is determined that the layout calculation for all container sets has been completed in step S1205 (YES in step S1205), the layout editing application 1101 terminates all processing.

Figure 13:
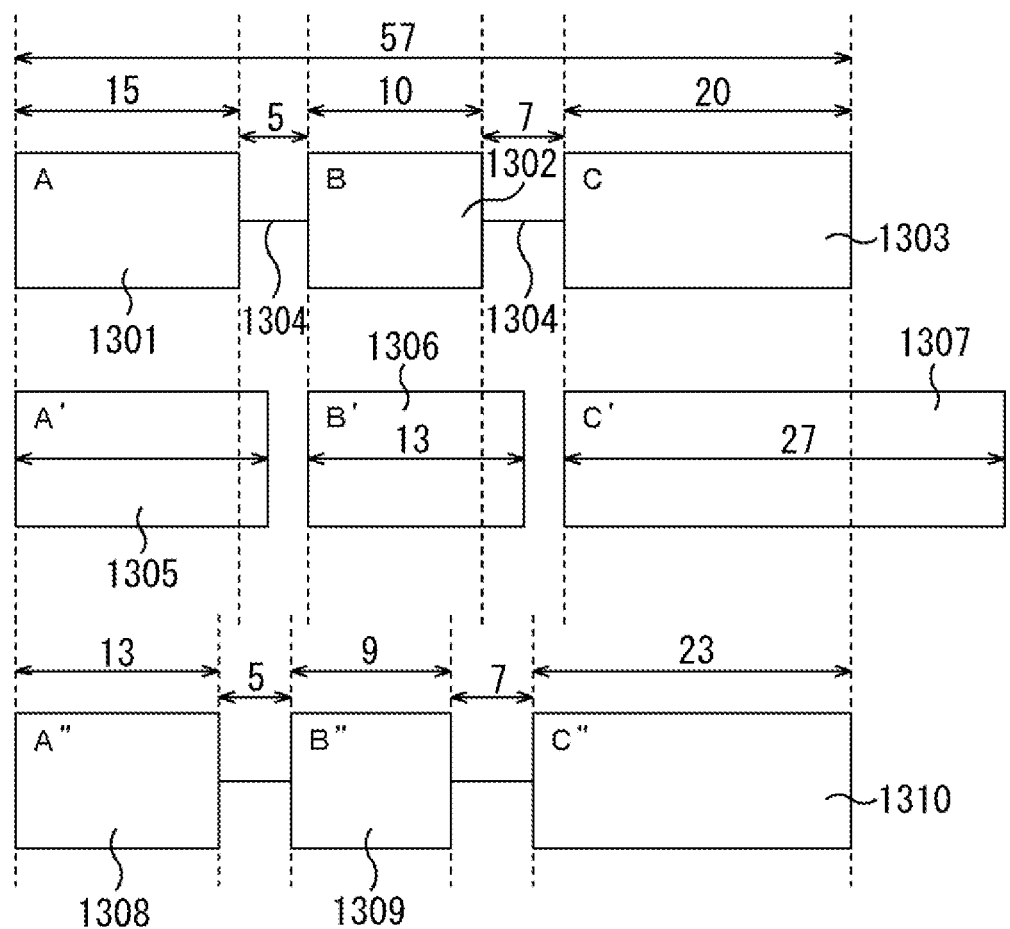
FIG. 13 illustrates an example of layout calculation processing according to an exemplary embodiment of the present invention.

Referring to FIG. 13, a specific example of the layout optimization in step S1203 is described below. Containers A, B, and C (1301, 1302, and 1303 respectively) are associated via a fixed link 1304. A horizontal size of each container and each link is illustrated in FIG. 13, which are 57 in sum total in a horizontal direction.

In this layout, the entire horizontal size is fixed. If content data A', B', and C' (1305, 1306, and 1307) are additionally inserted to the containers in this layout, a stress (layout load) is generated.

Each content has an actual size (ideal size) as described in FIG. 13. The content A' has an ideal size of 17, the content B' has an ideal size of 13, and the content C' has an ideal size of 27. If the content data is text data, its ideal size is determined based on a current content amount (character amount) of content data, a font size, information about whether a lengthwise/widthwise size is flexible/fixed, and a maximum/minimum value, which are set to a container to which data is inserted.

Further, if the content data is image data, a size of the image data (the number of pixels in vertical and horizontal directions) is an ideal size. A horizontal size of 17+5+13+7+27=69 is necessary to insert the content data into containers and lay out all of them in an ideal size. However, as described above, the horizontal size of this layout is fixed to 57. Therefore, a stress of 69−57=12 is applied to this layout.

Next, the stress is distributed to the containers. In this automatic layout system, layout calculation is performed to minimize the applied stress based on the least squares method.

When a, b, and c represent calculated sizes of the containers, a cost k that is the sum of the squares of the stress applied to each container is given by the following expression:

$$k=(a-17)^2+(b-13)^2+(c-27)^2 \qquad (1)$$

In this layout, priorities are not assigned, so that the cost k is minimized under the following condition:

$$a-17=b-13=c-27 \qquad (2)$$

Further, the following expression is established based on the calculated layout size:

$$a+5+b+7+c=57 \qquad (3)$$

A calculated size of each container is derived from Expressions (2) and (3). In this example, a stress of 4 is applied to each container, and calculated sizes of 13, 9, and 27 for the resulting containers 1308, 1308, and 1310 (A", B", and C") respectively are illustrated in FIG. 13.

The above calculation processing is also performed in a vertical direction to execute the processing in step S811.

The first exemplary embodiment describes processing performed on a template where a plurality of containers is set, but processing of the first exemplary embodiment may also be performed on the sub template.

Figure 17:
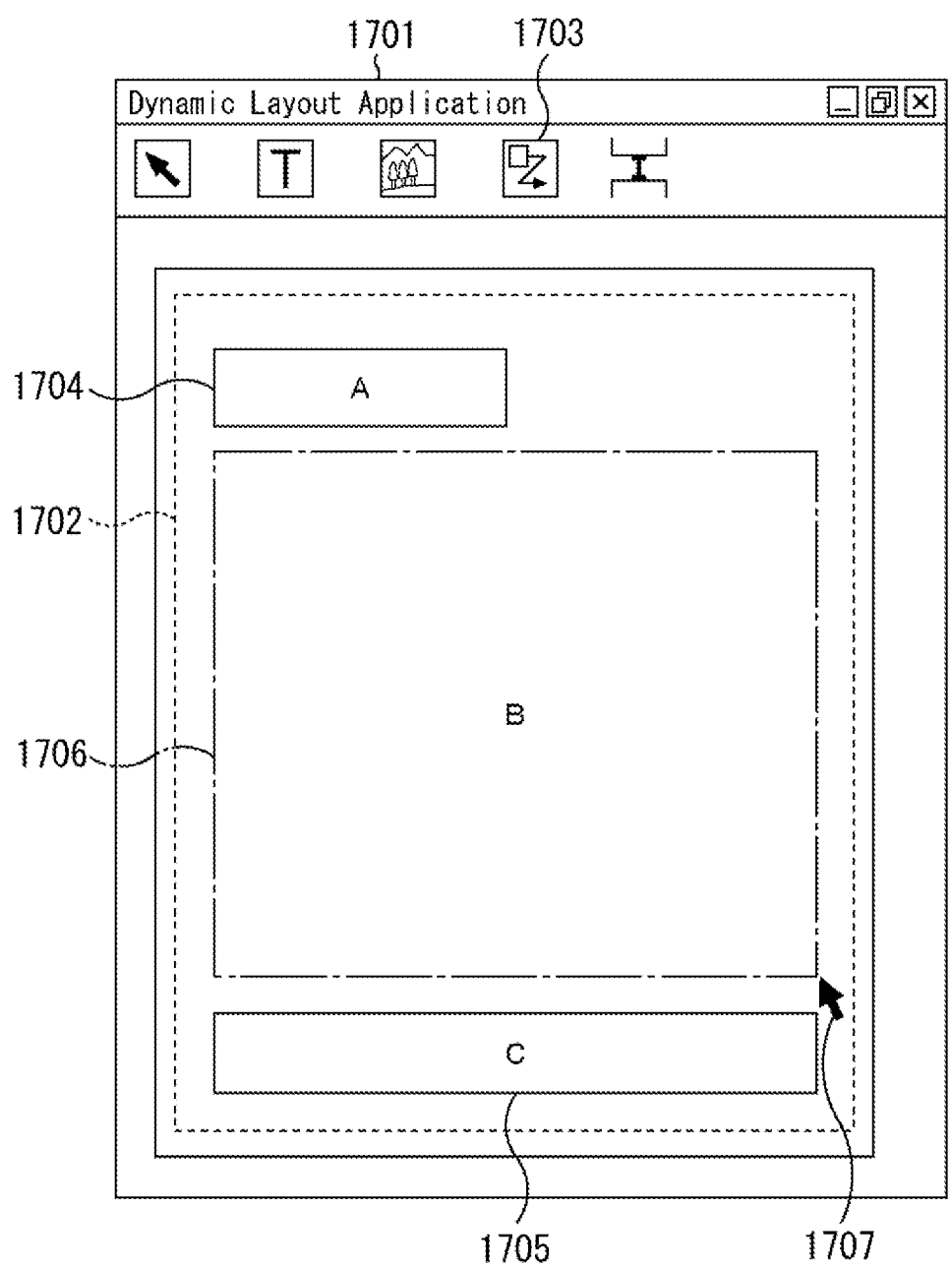
FIG. 17 illustrates an example of a flow area according to an exemplary embodiment of the present invention.

First, a sub template and a flow area are described. In FIG. 17, a flow area 1706 is illustrated in a page area 1701. This template also includes a text container 1704 and an image container 1705. On a user interface, the flow area 1706 and containers are represented in different forms to enable a user to visually recognize a target portion.

As for the text container 1704 and the image container 1705, variable data are read from a database and arranged. On the other hand, a sub template to which data extracted from the database is input is arranged in the flow area 1706. The flow area 1706 can be set by clicking a button 1703.

Figure 18:
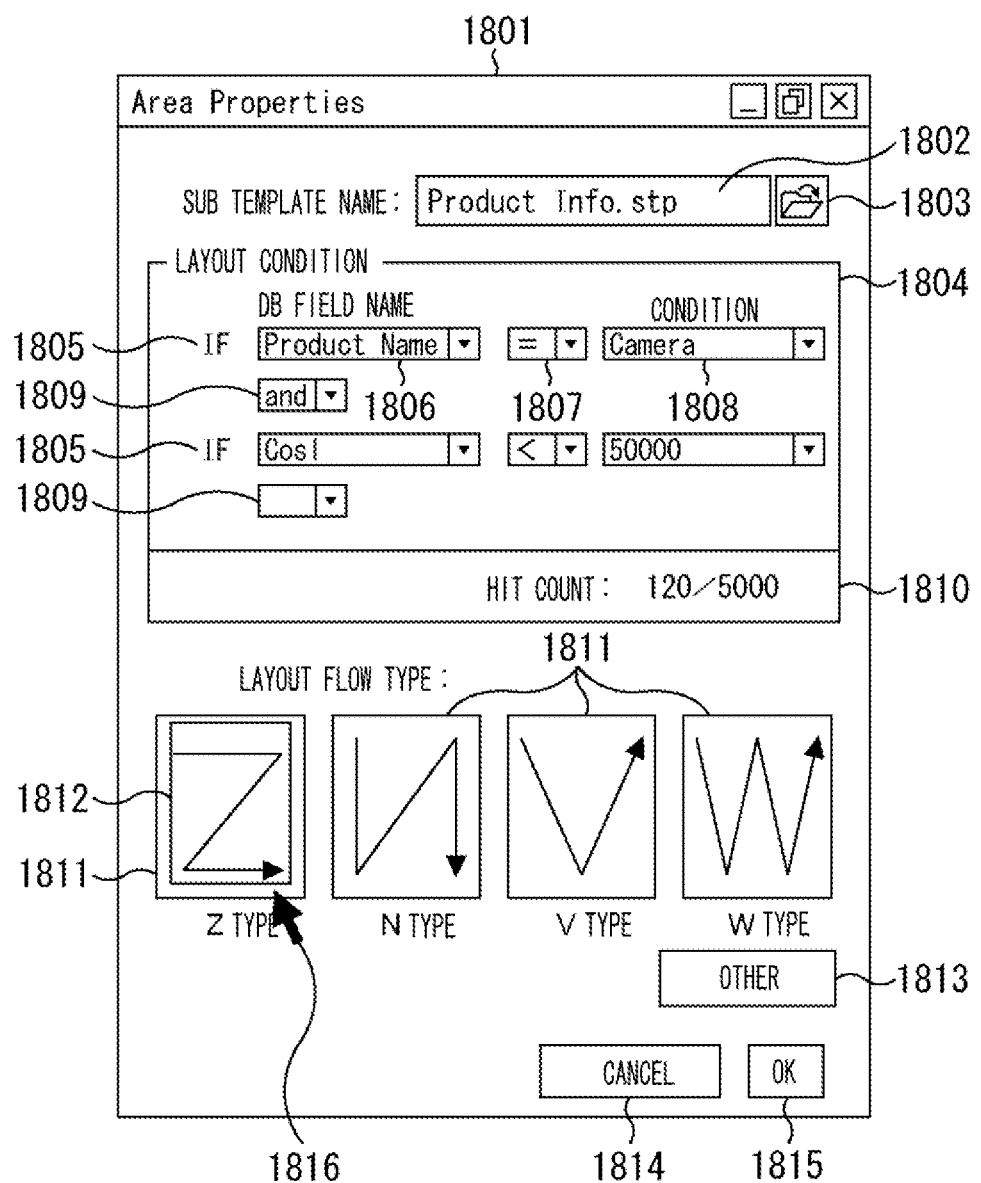
FIG. 18 illustrates an example of a setting screen for a flow area according to an exemplary embodiment of the present invention.

FIG. 18 illustrates a setting screen 1801 for setting extraction conditions for the flow area and setting a sub template. A user sets a sub template used in the flow area to a field 1802. Alternatively, the user may designate a sub template name using a file open icon 1803. The arrow in FIG. 18 indicates a mouse pointer 1816.

Next, the user inputs one or more conditional expression 1805 in an area 1804. In a list box 1806, a field name of a target data file is input. In a list box 1807, an operator for calculating conditional determination is input. In a list box 1808, a condition is input. In a list box 1809, an operator for linking conditional expressions is input.

In the list boxes 1806, 1807, 1808, and 1809, a target value may be selected from a list and directly input. In the example of FIG. 18, the following extraction conditions are set: "Camera" in the "Product Name" field and "less than 50000" in the "Cost" field. The layout editing application 1101 extracts data from a database based on the extraction conditions set in FIG. 18. Further, in a hit count field 1810, the number of items of extracted data is displayed.

Next, the user selects a desired layout flow type from a pattern field 1811. A layout pattern 1812 is a current pattern. In FIG. 18, a Z type is selected. Further, the user may set a flow type other than the Z type, an N type, a V type, and a W type of FIG. 18. The layout editing application 1101 arranges sub templates in accordance with the designated flow type. The other flow type can be set by clicking a button 1813.

The flow type is not limited to the above described types, and other types are applicable. Further, any flow type is always selected as a default. Accordingly, if not necessary, the user may not set a flow type. It is desirable to set different flow types corresponding to the number of sub templates that are to be laid out in the flow area (the number of data determined by the layout conditions). Thus, the pattern field 1811 of FIG. 18, which is used for selecting a layout flow type, may include candidate patterns corresponding to the number of sub templates. FIG. 18 also includes a cancel button 1814 to cancel the setting extraction conditions and a commit button to O.K. the setting of extraction conditions.

Figure 19:
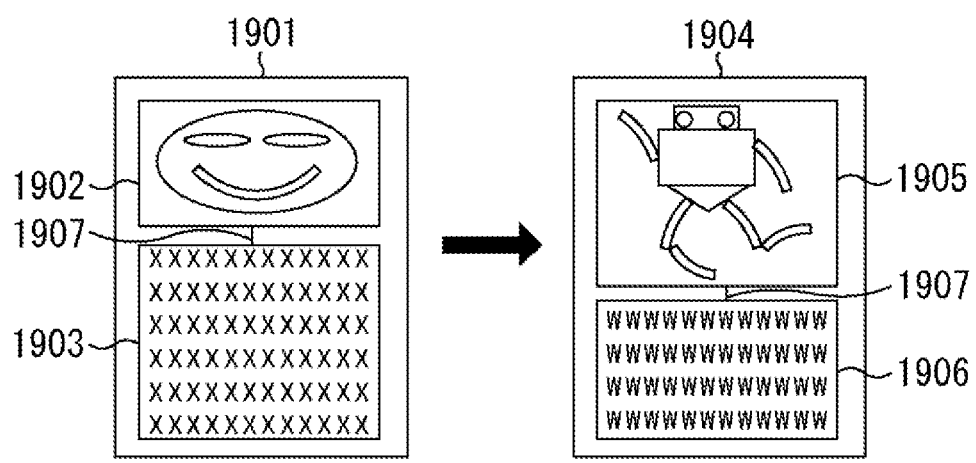
FIG. 19 illustrates an example of a sub template according to an exemplary embodiment of the present invention.

The above-described sub template will be described below in detail. FIG. 19 illustrates a layout example of records and a layout flow according to a sub template. In the sub template, image containers or text containers are arranged, and the data that is inserted into each container is set. The sub template data is not particularly different from a general template.

The sub template is useful when the same layout is repeatedly used in one document or when the layout is applied to other documents. A link can be set between image containers and text containers arranged in the sub template. Thus, a layout size (as well as position) can be optimally changed in accordance with layout data.

FIG. 19 illustrates a layout example of records using the sub template. Outer frames 1901 and 1904 of the sub template, image containers 1902 and 1905, text containers 1903 and 1906, and a link 1907 are included therein. The two output data of FIG. 19 are obtained using the same sub template. However, since different content data are input, the output data are not the same.

Figure 20:
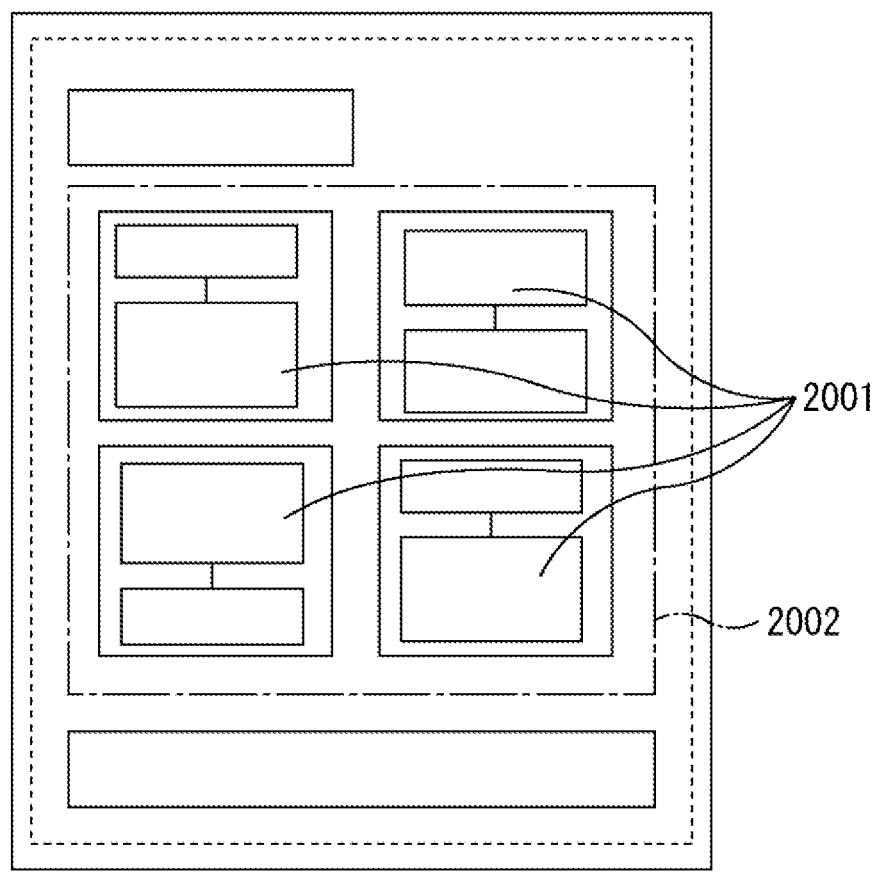
FIG. 20 illustrates an example of where a sub template is arranged in a flow area according to an exemplary embodiment of the present invention.

FIG. 20 illustrates the arrangement for output data obtained using the sub template of FIG. 19. In the example of FIG. 20, four records are extracted under the conditions of FIG. 18, so that the extracted four records are inserted into sub templates 2001 and arranged in a flow area 2002. Boxes in each sub template 2001 are containers already subjected to layout calculation.

Referring to FIG. 21, a layout example of sub templates to which the above transposition link attributes are set is described below. The same sub template as that of FIG. 19 is used in the example, but transposition link attributes are set in this sub template.

As a result, although the same flow area and sub template as those of FIG. 20 are used, a container arrangement direction in the sub templates 2102 and 2103 is changed to a horizontal direction from a vertical direction in FIG. 20. As described above, the container arrangement direction can be changed in accordance with content data to be input, by setting of transposition link attributes to the sub template.

Transposition link attributes are also set to both of the sub templates 2101 and 2104, but content data to be inserted into the sub templates 2101 and 2104 is horizontally long as an analysis result so the containers in these sub templates 2101 and 2104 are arranged in a vertical direction.

FIG. 22 illustrates a setting screen for setting transposition link attributes to the sub template. This screen is similar to that of FIG. 18 except that a checkbox 2201 for setting the transposition link attributes is added. The container arrangement direction can be changed in accordance with content data by checking the checkbox 2201.

As described above, according to the first exemplary embodiment, two containers arranged in a template are linked via a vertical/horizontal transposition link so that the containers are arranged, based on content data, in an appropriate direction using one template.

Second Exemplary Embodiment

A second exemplary embodiment of the present invention is directed to hierarchical management for a sub template.

Figure 9A:
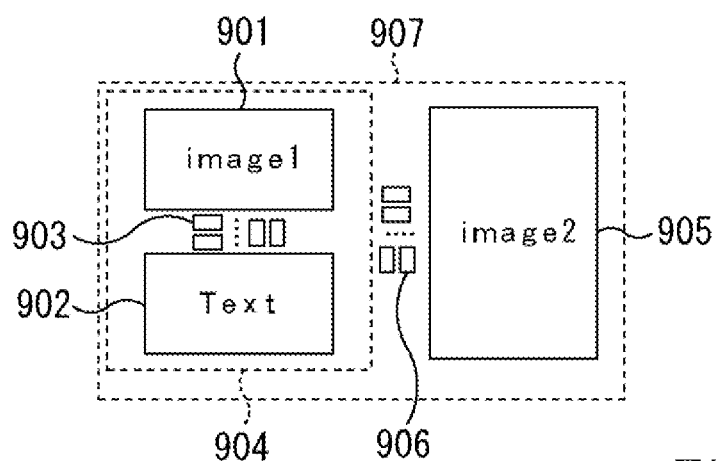
FIGS. 9A and 9B illustrates an example of a hierarchical management image of the vertical/horizontal transposition link according to an exemplary embodiment of the present invention.
Figure 9B:
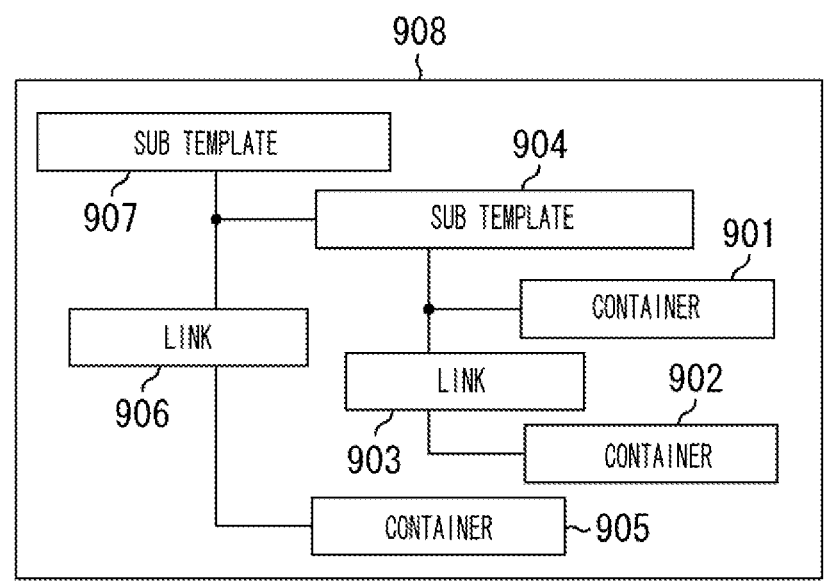

FIGS. 9A and 9B illustrate an example of sub template layout and an internal configuration 908 of the hierarchical management of the sub template respectively. In FIGS. 9A and 9B, an image container 901 and a text container 902 are linked via a vertical/horizontal transposition link 903. In this exemplary embodiment, the vertical/horizontal transposition link is represented in a form different from the first exemplary embodiment to facilitate understanding of a hierarchical structure but operates similar to the link of the first exemplary embodiment. Further, this representation is an example of visual expression and there is no particular limitation as to the representation. A sub template 904 is composed of two containers linked via the link 903.

On the other hand, an image container 905 is liked with the sub template 904 via a vertical/horizontal transposition link 906. Further, the sub template 904 and the container 905 linked via the vertical/horizontal transposition link 906 constitute a sub template 907. In this way, in the present exemplary embodiment, containers and sub templates are linked via any link to attain the hierarchical structure.

The internal configuration 908 of the sub template 907 is illustrated in a hierarchical form in FIG. 9B. The sub template 907 is obtained by linking the sub template 904 and the container 905 via the link 906. Further, the sub template 904 is obtained by linking the containers 901 and 902 via the link 903.

Figure 10:
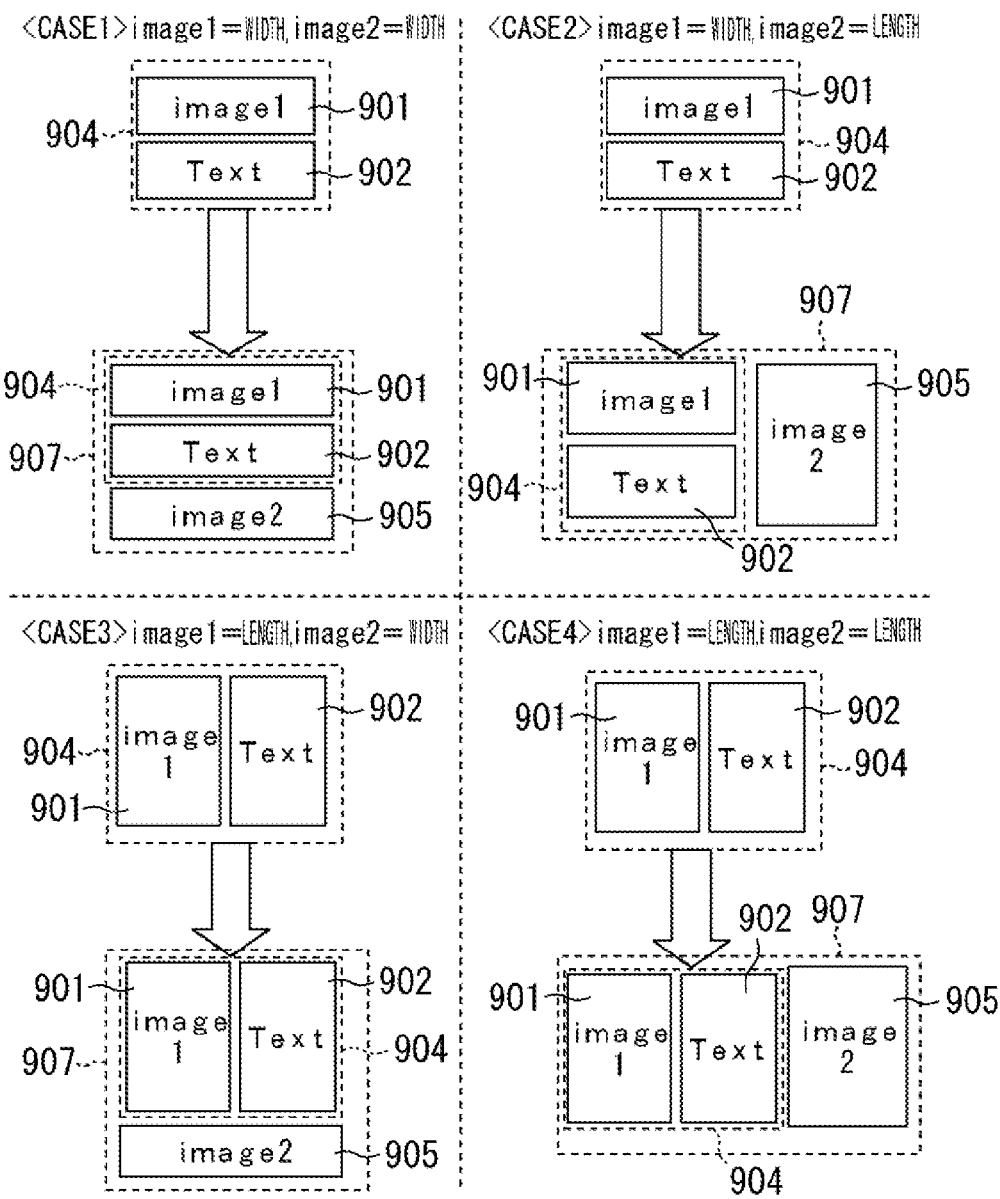
FIG. 10 illustrates an operational example of each layer of a vertical/horizontal transposition link according to an exemplary embodiment of the present invention.

FIG. 10 illustrates an example where arrangement of the image containers 901 and 905 in the sub template 907 of FIG. 9A is changed in accordance with an orientation of each image data.

In a case of the upper left of FIG. 10, the image container 901 and the image container 905 are horizontally long. The internal sub template 904 is processed first. Since the image container 901 is horizontally long, the containers 901 and 902 are arranged in a vertical direction. Next, since the image container 905 is horizontally long, the sub template 904 and the image container 905 are arranged in the vertical direction, and the final layout is determined.

Similarly, in a case of the upper right of FIG. 10, the image container 901 is horizontally long and the image container 905 is vertically long. In the sub template 904, the containers 901 and 902 are arranged in the vertical direction because the image container 901 is horizontally long. In the sub template 907, the sub template 904 and the image container 905 are arranged side by side (in the horizontal direction) because the image container 905 is vertically long.

Further, in a case of the lower left of FIG. 10, the image container 901 is vertically long and the image container 905 is horizontally long. In the sub template 904, since the image container 901 is vertically long, the containers 901 and 902 are arranged in a horizontal direction. In the sub template 907, since the image container 905 is horizontally long, the sub template 904 and the image container 905 are arranged in a vertical direction.

Finally, in a case of the lower right of FIG. 10, the image container 901 and the image container 905 are vertically long. In both of the sub template 904 and the sub template 907, since the image containers 901 and 905 are vertically long, all of the containers 901, 902, and 905 are arranged in the horizontal direction.

Flowcharts of the processing of the present exemplary embodiment are easy to infer from the above description, so further detailed description thereof is omitted here.

Third Exemplary Embodiment

In the first exemplary embodiment, if vertically long image data and horizontally long image data are inserted as content data, the layout editing application 1101 determines a container arrangement direction in accordance with priorities assigned to the containers. A third exemplary embodiment of the present invention is directed to another example of the processing for determining a container arrangement direction executed by the layout editing application 1101 when vertically long image data and horizontally long image data are inserted as content data.

In the third exemplary embodiment, the layout editing application 1101 calculates an amount of change necessary for inserting vertically long image data and horizontally long image data into a template where containers are arranged in a vertical direction. Moreover, the layout editing application 1101 calculates an amount of change necessary for inserting vertically long image data and horizontally long image data into a template where containers are arranged in the horizontal direction. Then, the layout editing application 1101 makes a determination to arrange containers in a direction that reduces an amount of change.

Figure 16:
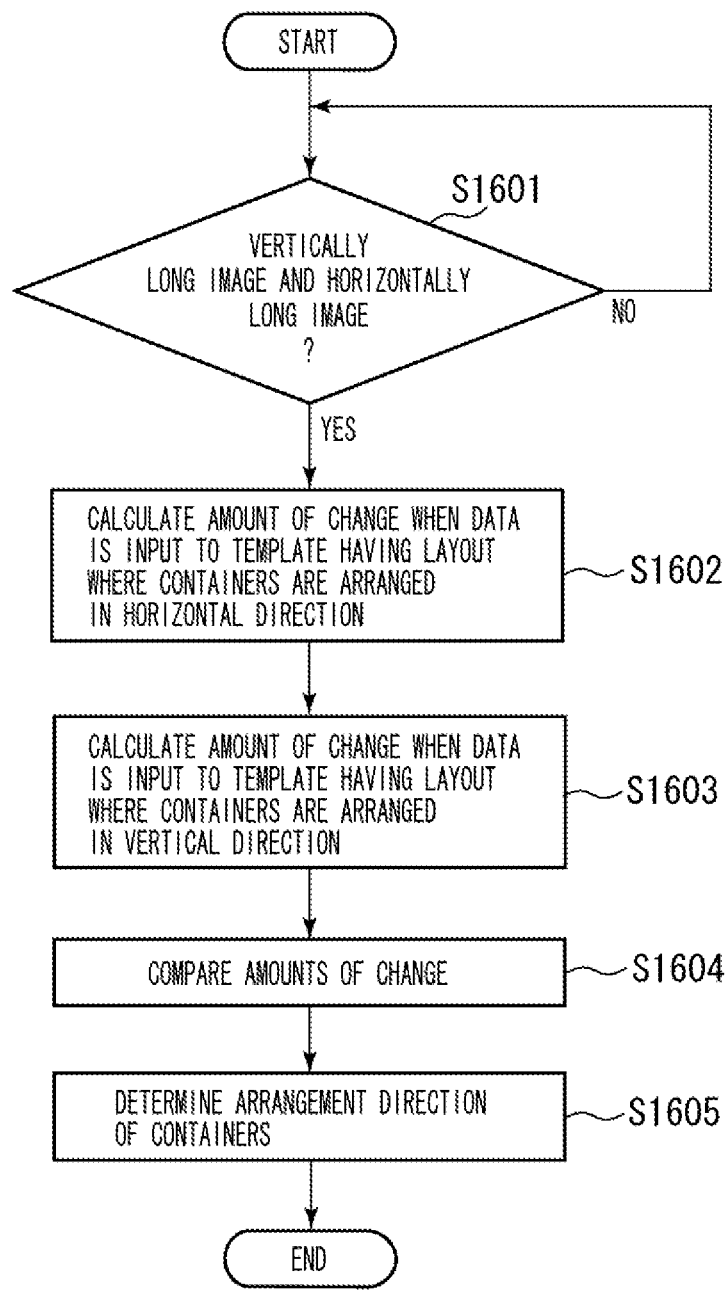
FIG. 16 is a flowchart of an example method of processing a vertically long image and a horizontally long image as content data according to an exemplary embodiment of the present invention.

A detailed processing of the third exemplary embodiment is described with reference to FIG. 16. In step S1601, the layout editing application 1101 analyzes content data to be inserted and determines whether vertically long image data and horizontally long image data are inserted. If vertically long and horizontally long image data are not inserted (NO in step S1601), processing returns to start to process (or wait for) next image data.

If the vertically long and horizontally long image data are inserted (YES in step S1601), in step S1602, the layout editing application 1101 calculates an amount of change in a size that is necessary for inserting the vertically long and horizontally long image data into a template where containers are arranged in a horizontal direction.

In step S1603, the layout editing application 1101 calculates an amount of change in a size that is necessary for inserting the vertically long and horizontally long image data into a template where containers are arranged in a vertical direction. As a specific method for calculating an amount of change in size in steps S1602 and S1603, a difference between an initial size of content data and the layout size obtained by the layout calculation is calculated as described above with reference to FIGS. 12 and 13.

In step S1604, the layout editing application 1101 compares an amount of change calculated in step S1602 with an amount of change calculated in step S1603. In step S1605, the layout editing application 1101 determines an arrangement direction of containers in a direction that reduces an amount of change. According to the third exemplary embodiment, the content data can be input in a size as close as possible to the initial size of the content data required in a template.

As described above, according to the third exemplary embodiment, sub templates linked via a vertical/horizontal transposition link are layered to enable automatic layout capable of freely arranging a plurality of sub templates in vertical and horizontal directions.

Other Exemplary Embodiments

Each unit of the information processing apparatus and each step of the information processing method according to the exemplary embodiments of the present invention can be implemented by executing programs stored in a RAM or ROM of a computer. The present invention encompasses the program and a computer-readable storage medium storing the program.

Further, the present invention can be implemented as a system, an apparatus, a method, a program product, or a storage medium, for example. To be specific, the present invention is applicable to a system composed of a plurality of devices or to an apparatus including one device.

According to the present invention, a software program for performing the functions of the above exemplary embodiments (in the exemplary embodiments, programs corresponding to the flowchart of FIG. 8, for example) are installed to a system directly or remotely. The present invention encompasses such an exemplary embodiment that the system or a computer of an apparatus reads a program code of the installed program and executes the programs to perform the functions.

According to the exemplary embodiment of the present invention, template layout can be changed in accordance with input data, so that a user does not need to prepare many templates, which reduces a burden on the user.

The present invention can be accomplished in the form of program code installed into the computer in order to perform the functions of the exemplary embodiments of the present invention with the computer. The present invention encompasses the computer program for performing the functions of the present invention, such as one stored on a computer (or other machine) readable medium or media.

In this case, an object code, a program executed by an interpreter, and script data supplied to an OS are applicable as long as program functions are realized.

A storage medium used for supplying the program includes, for example, a Floppy® disk, a hard disk, an optical disk, a magneto-optical (MO) disk, a compact disc-ROM (CD-ROM), a CD-recordable (CD-R), a CD-rewritable (CD-RW), a magnetic tape, a nonvolatile memory card, a ROM, and a digital versatile disc (DVD) (DVD-ROM and DVD-R).

As for a possible method of supplying a program, a browser on a client computer is used to access the Internet web page. Then, a computer program of the present invention or a compressed file having an automatic installing function is downloaded into a storage medium such as a hard disk to supply the program.

Further, the program can be supplied by dividing the program code of the program according to the present invention into a plurality of files and downloading the files from different web pages. For example, the present invention encompasses a World Wide Web (WWW) as a server for downloading to a plurality of users a program file that realizes the functions of the present invention on a computer.

Further, the functions of the present invention can be executed as follows, for example. A program of the present invention may be encoded, stored in a storage medium such as a CD-ROM, and distributed to users. Users who meet a preset condition are allowed to download information about decryption key from a web page via the Internet. Then, the encoded program is executed using the downloaded key information and installed into a computer.

Further, the functions of the exemplary embodiments can be realized by executing programs read by a computer. Besides, the functions of the exemplary embodiments can be realized by executing a part or all of actual processing with an operating system (OS) running on a computer in response to an instruction of the program.

Further, the functions of the exemplary embodiments can be realized as follows, for example. A program read from a storage medium is written to a memory in an expansion board inserted into a computer or an expansion unit connected to the computer. After that, in response to an instruction of the program, a CPU in the expansion board or unit executes a part or all of the actual processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-007340 filed Jan. 16, 2007, which is hereby incorporated by reference herein in its entirety.

What is claimed is:

1. An information processing apparatus comprising at least one processor which executes a program stored in a memory, wherein the at least one processor functions as:
a generating unit is configured to generate a template including first and second areas where content data is inserted;
a setting unit configured to associate the first area with the second area before the content data is decided;
a determination unit configured to determine an arrangement direction in the template by selecting between a vertical direction and a horizontal direction, the selecting based on the content data which is inserted into at least one of the first and second areas associated with each other by the setting unit; and
a layout unit configured to arrange the first and second areas in the arrangement direction determined by the determination unit;
wherein the first and second areas where the content data is inserted are outputted,
the setting unit includes a second setting unit configured to assign priorities to the first and second areas, and
the determination unit determines to arrange the first and second areas in a horizontal direction when vertically long image data is inserted as content data to a higher-priority area to be processed in accordance with the priorities assigned by the second setting unit and horizontally long image data is inserted as content data into a lower-priority area, and the determination unit determines to arrange the first and second areas in a vertical direction when horizontally long image data is inserted as content data into a higher-priority area to be processed in accordance with the priorities assigned by the second setting unit and vertically long image data is inserted as content data to a lower-priority area.

2. The information processing apparatus according to claim 1, wherein the setting unit sets an attribute by which an arrangement direction of the first and second areas is changed in accordance with the content data inserted into the first and second areas, and
the determination unit determines an arrangement direction of the first and second areas when the attribute is set.

3. The information processing apparatus according to claim 2, wherein the setting unit sets a link to associate the attribute with the first and second areas, and
the determination unit determines the arrangement direction of the first and second areas in response to the link.

4. An information processing apparatus comprising at least one processor which executes a program stored in a memory, wherein the at least one processor functions as:
a generating unit is configured to generate a template including first and second areas where content data is inserted;
a setting unit configured to associate the first area with the second area before the content data is decided;
a determination unit configured to determine an arrangement direction in the template by selecting between a vertical direction and a horizontal direction, the selecting based on the content data which is inserted into at least one of the first and second areas associated with each other by the setting unit; and
a layout unit configured to arrange the first and second areas in the arrangement direction determined by the determination unit;
wherein the first and second areas where the content data is inserted are outputted; and further comprising
a comparison unit configured to compare an amount of change in size necessary for inserting first content data and second content data into a template where the first and second areas are arranged in a vertical direction, with an amount of change in size necessary for inserting the first and second content data into a template where the first and second areas are arranged in a horizontal direction, when the first content data is inserted as vertically long image data into the first area and the second content data is inserted as horizontally long image data into the second area,
wherein the determination unit determines to arrange the first and second areas in a direction that reduces the amount of change in size based on a comparison result from the comparison unit.

5. The information processing apparatus according to claim 4, wherein the setting unit sets an attribute by which an arrangement direction of the first and second areas is changed in accordance with the content data inserted into the first and second areas, and
the determination unit determines an arrangement direction of the first and second areas when the attribute is set.

6. The information processing apparatus according to claim 5, wherein the setting unit sets a link to associate the attribute with the first and second areas, and
the determination unit determines the arrangement direction of the first and second areas in response to the link.

7. An information processing method, comprising:
generating a template including first and second areas where content data is inserted;
associating the first area with the second area before content data is decided;
automatically determining an arrangement direction in the template by selecting between a vertical direction and a horizontal direction, the selecting based on the content data which is inserted into at least one of the first and second areas associated with each other by the associating;
automatically arranging the first and second areas in the determined arrangement direction;
and wherein the first and second areas where the content data is inserted are outputted; and further comprising:
assigning priorities to the first and second areas; and
determining to arrange the first and second areas in a horizontal direction when vertically long image data is inserted as content data into a higher-priority area to be processed in accordance with the assigned priorities and horizontally long image data is inserted as content data into a lower-priority area, and determining to arrange the first and second areas in a vertical direction when horizontally long image data is inserted as content data into a higher-priority area to be processed in accordance with the assigned priorities and vertically long image data is inserted as content data into a lower-priority area.

8. The information processing method according to claim 7, further comprising:
setting an attribute by which an arrangement direction of the first and second areas is changed in accordance with the content data inserted into the first and second areas; and
determining an arrangement direction of the first and second areas when the attribute is set.

9. The information processing method according to claim 8, further comprising setting a link to associate the attribute with the first and second areas, and determining the arrangement direction of the first and second areas in response to the link.

10. An information processing method, comprising:
    generating a template including first and second areas where content data is inserted;
    associating the first area with the second area before content data is decided;
    automatically determining an arrangement direction in the template by selecting between a vertical direction and a horizontal direction, the selecting based on the content data which is inserted into at least one of the first and second areas associated with each other by the associating;
    automatically arranging the first and second areas in the determined arrangement direction; and wherein the first and second areas where the content data is inserted are outputted;
    comparing an amount of change in size necessary for inserting first content data and second content data into a template where the first and second areas are arranged in a vertical direction, with an amount of change in size necessary for inserting the first and second content data into a template where the first and second areas are arranged in a horizontal direction, when the first content data is inserted as vertically long image data into the first area and the second content data is inserted as horizontally long image data into the second area; and
    determining to arrange the first and second areas in a direction that reduces the amount of change in size based on a result of the comparison.

11. The information processing method according to claim 10, further comprising:
    setting an attribute by which an arrangement direction of the first and second areas is changed in accordance with the content data inserted into the first and second areas; and
    determining an arrangement direction of the first and second areas when the attribute is set.

12. The information processing method according to claim 11, further comprising setting a link to associate the attribute with the first and second areas, and
    determining the arrangement direction of the first and second areas in response to the link.

13. A program, embodied on a non-transitory computer readable medium, that causes the computer to execute an information processing method, the information processing method comprising:
    generating a template including first and second areas where content data is inserted;
    associating the first area with the second area before content data is decided;
    determining an arrangement direction in the template by selecting between a vertical direction and a horizontal direction, the selecting based on the content data which is inserted into at least one of the first and second areas associated with each other by the associating;
    arranging the first and second areas in the determined arrangement direction; and wherein
    the first and second areas where the content data is inserted are outputted; and further comprising:
    assigning priorities to the first and second areas; and
    determining to arrange the first and second areas in a horizontal direction when vertically long image data is inserted as content data into a higher-priority area to be processed in accordance with the assigned priorities and horizontally long image data is inserted as content data into a lower-priority area, and determining to arrange the first and second areas in a vertical direction when horizontally long image data is inserted as content data into a higher-priority area to be processed in accordance with the assigned priorities and vertically long image data is inserted as content data into a lower-priority area.

14. The program, embodied on a non-transitory computer readable medium, that causes the computer to execute an information processing method according to claim 13, wherein the information processing method further comprises:
    setting an attribute by which an arrangement direction of the first and second areas is changed in accordance with the content data inserted into the first and second areas; and
    determining an arrangement direction of the first and second areas when the attribute is set.

15. The program, embodied on a non-transitory computer readable medium, that causes the computer to execute an information processing method according to claim 14, wherein the information processing method further comprises:
    setting a link to associate the attribute with the first and second areas, and
    determining the arrangement direction of the first and second areas in response to the link.

16. A program, embodied on a non-transitory computer readable medium, that causes the computer to execute an information processing method, the information processing method comprising:
    generating a template including first and second areas where content data is inserted;
    associating the first area with the second area before content data is decided;
    determining an arrangement direction in the template by selecting between a vertical direction and a horizontal direction, the selecting based on the content data which is inserted into at least one of the first and second areas associated with each other by the associating;
    arranging the first and second areas in the determined arrangement direction; and wherein
    the first and second areas where the content data is inserted are outputted; and further comprising:
    comparing an amount of change in size necessary for inserting first content data and second content data into a template where the first and second areas are arranged in a vertical direction, with an amount of change in size necessary for inserting the first and second content data into a template where the first and second areas are arranged in a horizontal direction, when the first content data is inserted as vertically long image data into the first area and the second content data is inserted as horizontally long image data into the second area; and
    determining to arrange the first and second areas in a direction that reduces the amount of change in size based on a result of the comparison.

17. The program, embodied on a non-transitory computer readable medium, that causes the computer to execute an information processing method according to claim 16, wherein the information processing method further comprises:
    setting an attribute by which an arrangement direction of the first and second areas is changed in accordance with the content data inserted into the first and second areas; and
    determining an arrangement direction of the first and second areas when the attribute is set.

18. The program, embodied on a non-transitory computer readable medium, that causes the computer to execute an information processing method according to claim 17, wherein the information processing method further comprises:
    setting a link to associate the attribute with the first and second areas, and
    determining the arrangement direction of the first and second areas in response to the link.

* * * * *